United States Patent
Chen et al.

(10) Patent No.: US 10,055,669 B2
(45) Date of Patent: Aug. 21, 2018

(54) METHODS AND SYSTEMS OF DETERMINING A MINIMUM BLOB SIZE IN VIDEO ANALYTICS

(71) Applicant: QUALCOMM Incorporated, San Diego, CA (US)

(72) Inventors: Ying Chen, San Diego, CA (US); Ning Bi, San Diego, CA (US); Lei Wang, Clovis, CA (US); Jinglun Gao, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 15/235,999

(22) Filed: Aug. 12, 2016

(65) Prior Publication Data

US 2018/0046877 A1    Feb. 15, 2018

(51) Int. Cl.
    *G06K 9/00*      (2006.01)
    *G06K 9/46*      (2006.01)
    *G06K 9/38*      (2006.01)

(52) U.S. Cl.
    CPC ........ *G06K 9/4642* (2013.01); *G06K 9/00711* (2013.01); *G06K 9/38* (2013.01)

(58) Field of Classification Search
    CPC ................. G06K 9/00–9/82; G06T 7/00–7/97
    See application file for complete search history.

(56) References Cited

U.S. PATENT DOCUMENTS

| | | |
|---|---|---|
| 2007/0058836 A1 | 3/2007 | Boregowda et al. |
| 2009/0110194 A1* | 4/2009 | Athsani .............. G06F 21/606 380/200 |
| 2013/0287264 A1 | 10/2013 | Chen et al. |
| 2015/0131851 A1 | 5/2015 | Bernal et al. |
| 2017/0243051 A1* | 8/2017 | Chukka .............. G06K 9/00147 |

(Continued)

FOREIGN PATENT DOCUMENTS

WO      2012148258 A1    11/2012

OTHER PUBLICATIONS

Bright D.S., "An Object-Finder for Digital Images Based on Multiple Thresholds, Connectivity, and Internal Structure," Journal of Computer-Assisted Microsc, Plenum Press, New York, NY, US, vol. 1, No. 4, Dec. 1, 1989 (Dec. 1, 1989), XP008007968, pp. 307-329, ISSN: 1040-7286.

(Continued)

*Primary Examiner* — Sean Motsinger
(74) *Attorney, Agent, or Firm* — Kilpatrick Townsend & Stockton/Qualcomm

(57) ABSTRACT

Techniques and systems are provided for processing video data. For example, techniques and systems are provided for determining blob size thresholds. Blob sizes of blobs generated for a video frame can be determined. A lower boundary of a category of blob sizes can then be determined that corresponds to a minimum blob size of the video frame. The lower boundary is determined from a plurality of possible blob sizes including the blob sizes of the blobs and one or more other possible blob sizes. One of the possible blob sizes is determined as the lower boundary when one or more lower boundary conditions are met by characteristics of the possible blob size. A blob size threshold for the video frame is assigned as the minimum blob size corresponding to the lower boundary.

30 Claims, 15 Drawing Sheets

(56) References Cited

U.S. PATENT DOCUMENTS

2018/0046858 A1* 2/2018 Chen ................ G06K 9/00577
2018/0046877 A1* 2/2018 Chen .................... G06K 9/4642

OTHER PUBLICATIONS

Celik H., "Dominant Object Detection for Autonomous Vision-Based Surveillance," In: "Phd Thesis", Feb. 15, 2010 (Feb. 15, 2010), TU DELFT, XP055041310, pp. 1-165.
Celik H., et al., "On the Development of an Autonomous and Self-Adaptable Moving Object Detector," 2007 IEEE Conference on Advanced Video and Signal Based Surveillance, Sep. 5, 2007 (Sep. 5, 2007), XP055401362, pp. 353-358, London, UK, DOI: 10.1109/AVSS.2007.4425336, ISBN: 978-1-4244-1695-0.
International Search Report and Written Opinion—PCT/US2017/034982—ISA/EPO—dated Sep. 25, 2017.
International Videlogix Human/Object Recognition: "Video Analytics to Drive Sales, Improve Efficiency, and Protect Assets", 2015, pp. 2.

* cited by examiner

| Detection Rate | V2 Adaptive Object Size | Size set to 64 | Size set to 128 | Size set to 256 | Size set to 512 | Size set to 1024 |
|---|---|---|---|---|---|---|
| VIRAT_S_0 | 0.21 | 0.21 | 0.16 | 0.15 | 0.13 | 0.13 |
| VIRAT_S_1 | 0.46 | 0.48 | 0.49 | 0.41 | 0.17 | 0.02 |
| VIRAT_S_2 | 0.32 | 0.44 | 0.43 | 0.37 | 0.35 | 0.21 |
| VIRAT_S_3 | 0.39 | 0.47 | 0.48 | 0.45 | 0.34 | 0.26 |
| VIRAT_S_4 | 0.43 | 0.44 | 0.43 | 0.34 | 0.20 | 0.11 |
| VIRAT_S_5 | 0.50 | 0.58 | 0.61 | 0.62 | 0.52 | 0.35 |
| VIRAT_S_6 | 0.46 | 0.46 | 0.46 | 0.46 | 0.45 | 0.38 |
| Ped_Det | 0.39 | 0.39 | 0.39 | 0.40 | 0.38 | 0.42 |
| IPCVA_0 | 0.46 | 0.41 | 0.46 | 0.47 | 0.46 | 0.46 |
| IPCVA_1 | 0.26 | 0.27 | 0.30 | 0.24 | 0.21 | 0.18 |
| IPCVA_2 | 0.37 | 0.48 | 0.40 | 0.39 | 0.42 | 0.35 |
| IPCVA_3 | 0.32 | 0.34 | 0.30 | 0.32 | 0.32 | 0.32 |
| IPCVA_4 | 0.37 | 0.41 | 0.35 | 0.38 | 0.38 | 0.37 |
| IPCVA_5 | 0.53 | 0.56 | 0.56 | 0.58 | 0.56 | 0.53 |
| *Average* | *0.39* | *0.42* | *0.42* | *0.40* | *0.35* | *0.29* |

FIG. 11

| Tracking Rate | V2 Adaptive Object Size | Size set to 64 | Size set to 128 | Size set to 256 | Size set to 512 | Size set to 1024 |
|---|---|---|---|---|---|---|
| VIRAT_S_0 | 0.35 | 0.35 | 0.25 | 0.22 | 0.20 | 0.20 |
| VIRAT_S_1 | 0.77 | 0.80 | 0.84 | 0.70 | 0.31 | 0.04 |
| VIRAT_S_2 | 0.59 | 0.79 | 0.77 | 0.64 | 0.61 | 0.41 |
| VIRAT_S_3 | 0.59 | 0.74 | 0.75 | 0.69 | 0.53 | 0.40 |
| VIRAT_S_4 | 0.74 | 0.79 | 0.76 | 0.54 | 0.28 | 0.16 |
| VIRAT_S_5 | 0.73 | 0.88 | 0.93 | 0.93 | 0.77 | 0.50 |
| VIRAT_S_6 | 0.75 | 0.65 | 0.71 | 0.73 | 0.70 | 0.65 |
| Ped_Det | 0.70 | 0.68 | 0.67 | 0.71 | 0.66 | 0.74 |
| IPCVA_0 | 0.72 | 0.27 | 0.56 | 0.63 | 0.68 | 0.76 |
| IPCVA_1 | 0.37 | 0.34 | 0.43 | 0.34 | 0.29 | 0.26 |
| IPCVA_2 | 0.55 | 0.60 | 0.56 | 0.59 | 0.64 | 0.51 |
| IPCVA_3 | 0.41 | -0.39 | 0.39 | 0.41 | 0.41 | 0.41 |
| IPCVA_4 | 0.56 | 0.51 | 0.41 | 0.58 | 0.56 | 0.59 |
| IPCVA_5 | 0.67 | 0.44 | 0.57 | 0.66 | 0.69 | 0.68 |
| *Average* | *0.61* | *0.53* | *0.61* | *0.60* | *0.52* | *0.45* |

FIG. 12

| True Pos. Rate | V2 Adaptive Object Size | Size set to 64 | Size set to 128 | Size set to 256 | Size set to 512 | Size set to 1024 |
|---|---|---|---|---|---|---|
| VIRAT_S_0 | 1.00 | 1.00 | 0.80 | 0.80 | 0.80 | 0.80 |
| VIRAT_S_1 | 1.00 | 1.00 | 1.00 | 1.00 | 0.73 | 0.27 |
| VIRAT_S_2 | 0.78 | 1.00 | 1.00 | 0.78 | 0.78 | 0.78 |
| VIRAT_S_3 | 0.96 | 1.00 | 1.00 | 0.96 | 0.93 | 0.89 |
| VIRAT_S_4 | 1.00 | 1.00 | 1.00 | 1.00 | 0.50 | 0.50 |
| VIRAT_S_5 | 1.00 | 1.00 | 1.00 | 1.00 | 1.00 | 0.89 |
| VIRAT_S_6 | 1.00 | 1.00 | 1.00 | 1.00 | 1.00 | 1.00 |
| Ped_Det | 0.94 | 1.00 | 1.00 | 1.00 | 1.00 | 1.00 |
| IPCVA_0 | 0.86 | 0.77 | 0.82 | 0.86 | 0.86 | 0.82 |
| IPCVA_1 | 1.00 | 0.89 | 1.00 | 0.78 | 1.00 | 0.89 |
| IPCVA_2 | 1.00 | 1.00 | 1.00 | 1.00 | 1.00 | 1.00 |
| IPCVA_3 | 0.50 | 0.83 | 0.50 | 0.50 | 0.50 | 0.50 |
| IPCVA_4 | 1.00 | 1.00 | 1.00 | 1.00 | 1.00 | 1.00 |
| IPCVA_5 | 1.00 | 1.00 | 1.00 | 1.00 | 1.00 | 1.00 |
| *Average* | *0.93* | *0.96* | *0.94* | *0.91* | *0.86* | *0.81* |

FIG. 13

| False Pos. Rate | V2 Adaptive Object Size | Size set to 64 | Size set to 128 | Size set to 256 | Size set to 512 | Size set to 1024 |
|---|---|---|---|---|---|---|
| VIRAT_S_0 | 0.25 | 0.25 | 0.20 | 0.00 | 0.00 | 0.00 |
| VIRAT_S_1 | 0.23 | 0.47 | 0.29 | 0.00 | 0.00 | 0.00 |
| VIRAT_S_2 | 0.00 | 0.00 | 0.00 | 0.00 | 0.00 | 0.00 |
| VIRAT_S_3 | 0.00 | 0.10 | 0.03 | 0.03 | 0.00 | 0.00 |
| VIRAT_S_4 | 0.25 | 0.25 | 0.25 | 0.20 | 0.00 | 0.00 |
| VIRAT_S_5 | 0.00 | 0.00 | 0.00 | 0.00 | 0.00 | 0.00 |
| VIRAT_S_6 | 0.13 | 0.40 | 0.36 | 0.22 | 0.20 | 0.00 |
| Ped_Det | 0.00 | 0.12 | 0.08 | 0.04 | 0.04 | 0.00 |
| IPCVA_0 | 0.22 | 0.68 | 0.61 | 0.49 | 0.31 | 0.20 |
| IPCVA_1 | 0.13 | 0.44 | 0.33 | 0.29 | 0.08 | 0.09 |
| IPCVA_2 | 0.08 | 0.53 | 0.50 | 0.00 | 0.19 | 0.09 |
| IPCVA_3 | 0.00 | 0.60 | 0.00 | 0.00 | 0.00 | 0.00 |
| IPCVA_4 | 0.12 | 0.53 | 0.46 | 0.28 | 0.17 | 0.12 |
| IPCVA_5 | 0.32 | 0.67 | 0.50 | 0.47 | 0.28 | 0.32 |
| *Average* | *0.12* | *0.36* | *0.26* | *0.14* | *0.09* | *0.06* |

FIG. 14

|  | Tracking Rate | | True Positive Rate | | False Positive Rate | |
|---|---|---|---|---|---|---|
|  | Adaptive Object Size | 256 | Adaptive | 256 | Adaptive | 256 |
| VIRAT_S_0 | 0.35 | 0.22 | 1.00 | 0.80 | 0.25 | 0.00 |
| VIRAT_S_1 | 0.77 | 0.70 | 1.00 | 1.00 | 0.23 | 0.00 |
| VIRAT_S_2 | 0.59 | 0.64 | 0.78 | 0.78 | 0.00 | 0.00 |
| VIRAT_S_3 | 0.59 | 0.69 | 0.96 | 0.96 | 0.00 | 0.03 |
| VIRAT_S_4 | 0.74 | 0.54 | 1.00 | 1.00 | 0.25 | 0.20 |
| VIRAT_S_5 | 0.73 | 0.93 | 1.00 | 1.00 | 0.00 | 0.00 |
| VIRAT_S_6 | 0.75 | 0.73 | 1.00 | 1.00 | 0.13 | 0.22 |
| Ped_Det | 0.70 | 0.71 | 0.94 | 1.00 | 0.00 | 0.04 |
| IPCVA_0 | 0.72 | 0.63 | 0.86 | 0.86 | 0.22 | 0.49 |
| IPCVA_1 | 0.37 | 0.34 | 1.00 | 0.78 | 0.13 | 0.29 |
| IPCVA_2 | 0.55 | 0.59 | 1.00 | 1.00 | 0.08 | 0.00 |
| IPCVA_3 | 0.41 | 0.41 | 0.50 | 0.50 | 0.00 | 0.00 |
| IPCVA_4 | 0.56 | 0.58 | 1.00 | 1.00 | 0.12 | 0.28 |
| IPCVA_5 | 0.67 | 0.66 | 1.00 | 1.00 | 0.32 | 0.47 |
| *Average* | *0.61* | *0.60* | *0.93* | *0.91* | *0.12* | *0.14* |

FIG. 15

METHODS AND SYSTEMS OF DETERMINING A MINIMUM BLOB SIZE IN VIDEO ANALYTICS

FIELD

The present disclosure generally relates to video analytics, and more specifically to techniques and systems for determining a minimum blob size used for blob filtering.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for determining a minimum blob size. The minimum blob size can be used for blob filtering in video analytics. A blob represents at least a portion of one or more objects in a video picture or frame. In some examples, using video analytics, background subtraction is applied to a picture and a foreground-background binary mask (referred to herein as a foreground mask or a foreground-background mask) is generated for the picture. Morphology operations can be applied to the foreground mask to reduce noise present in the foreground mask. Once morphology operations are applied, connected component analysis can be performed to generate the blobs. The blobs can then be provided, for example, for blob processing, object tracking, and other video analytics functions.

During blob detection, noisy blobs may be generated. Noisy blobs correspond to objects that appear to move, but that are part of the background (e.g., trees that move due to wind, shadows that change due to the movement of the sun, or other moving background objects). It is critical to know the size of a typical small object that should be detected for a scene. Based on the size of the typical small object, blob analysis and blob tracking algorithms can be made more accurate. The techniques and systems described herein provide blob filtering for blob/object detection by determining a minimum blob size of expected typical objects for a given frame. The minimum blob size can be used for various blob analysis and filtering purposes, including, for example, to filter out blobs that are smaller than the minimum blob size. Using such a technique, noisy blobs can be filtered from the blobs generated for the frame, while blobs corresponding to real foreground objects are maintained.

According to at least one example, a method of determining one or more blob size thresholds for filtering blobs is provided that includes determining a plurality of blob sizes of a plurality of blobs generated for a video frame. The method further includes determining a lower boundary of a category of blob sizes. The lower boundary corresponds to a minimum blob size of the video frame. The lower boundary is determined from a plurality of possible blob sizes including the plurality of blob sizes and one or more other possible blob sizes. A possible blob size is determined as the lower boundary when one or more lower boundary conditions are met by characteristics of the possible blob size. The method further includes assigning a blob size threshold for the video frame as the minimum blob size corresponding to the lower boundary.

In another example, an apparatus is provided that includes a memory configured to store video data and a processor. The processor is configured to and can determine a plurality of blob sizes of a plurality of blobs generated for a video frame. The processor is configured to and can determine a lower boundary of a category of blob sizes. The lower boundary corresponds to a minimum blob size of the video frame. The lower boundary is determined from a plurality of possible blob sizes including the plurality of blob sizes and one or more other possible blob sizes. A possible blob size is determined as the lower boundary when one or more lower boundary conditions are met by characteristics of the possible blob size. The processor is configured to and can assign a blob size threshold for the video frame as the minimum blob size corresponding to the lower boundary.

In another example, a computer readable medium is provided having stored thereon instructions that when executed by a processor perform a method that includes: determining a plurality of blob sizes of a plurality of blobs generated for a video frame; determining a lower boundary of a category of blob sizes, the lower boundary corresponding to a minimum blob size of the video frame, wherein the lower boundary is determined from a plurality of possible blob sizes including the plurality of blob sizes and one or more other possible blob sizes, and wherein a possible blob size is determined as the lower boundary when one or more lower boundary conditions are met by characteristics of the possible blob size; and assigning a blob size threshold for the video frame as the minimum blob size corresponding to the lower boundary.

In another example, an apparatus is provided that includes means for determining a plurality of blob sizes of a plurality of blobs generated for a video frame. The apparatus further comprises means for determining a lower boundary of a category of blob sizes. The lower boundary corresponds to a minimum blob size of the video frame. The lower boundary is determined from a plurality of possible blob sizes including the plurality of blob sizes and one or more other possible blob sizes. A possible blob size is determined as the lower boundary when one or more lower boundary conditions are met by characteristics of the possible blob size. The apparatus further comprises means for assigning a blob size threshold for the video frame as the minimum blob size corresponding to the lower boundary.

In some aspects, the methods, apparatuses, and computer readable medium described above further comprise: determining a size of a blob of the plurality of blobs is smaller than the blob size threshold; and filtering the blob from the plurality of blobs when the size of the blob is smaller than the blob size threshold.

In some aspects, the methods, apparatuses, and computer readable medium described above further comprise: generating a histogram of the plurality of blob sizes, the histogram including the plurality of possible blob sizes and a number of blobs corresponding to each possible blob size, wherein the lower boundary is determined based on the histogram.

In some aspects, the methods, apparatuses, and computer readable medium described above further comprise: quantizing the plurality of possible blob sizes, wherein the histogram includes the quantized plurality of possible blob sizes.

In some aspects, the minimum blob size includes a quantized value determined using a quantization factor. In such aspects, assigning the blob size threshold for the video frame as the minimum blob size includes: dequantizing the minimum blob size by dividing the minimum blob size by the quantization factor; and assigning the blob size threshold as the dequantized minimum blob size.

In some aspects, determining the lower boundary comprises determining the possible blob size in the histogram as the lower boundary. The possible blob size in the histogram is determined as the lower boundary when the one or more lower boundary conditions are met.

In some aspects, the methods, apparatuses, and computer readable medium described above further comprise: determining a second lower boundary of a second category of blob sizes, wherein the second lower boundary includes a second possible blob size in the histogram, the second possible blob size being larger than the possible blob size in the histogram; and determining a number of blobs having one or more sizes between the possible blob size in the histogram and the second possible blob size corresponding to the second lower boundary, wherein the one or more lower boundary conditions include the number of blobs being higher than a threshold number.

In some aspects, the one or more lower boundary conditions include a size gap from a current possible blob size with a positive histogram value to a next possible blob size with a positive histogram value being larger than a size gap threshold.

In some aspects, the one or more lower boundary conditions include a total number of bins left in the histogram being less than a threshold number of bins, wherein a bin corresponds to a possible blob size in the histogram.

In some aspects, the minimum blob size includes an initial minimum blob size for the video frame. In such aspects, assigning the blob size threshold for the video frame as the minimum blob size includes: determining a final minimum blob size by temporally filtering the initial minimum blob size, wherein temporally filtering the initial minimum blob size includes combining a final minimum blob size of a previous frame with the initial minimum blob size for the video frame; and assigning the blob size threshold for the video frame as the final minimum blob size.

In some aspects, temporally filtering the initial minimum blob size further includes: weighting the final minimum blob size of the previous frame by a first amount; weighting the initial minimum blob size for the video frame by a second amount; and combining the weighted final minimum blob size of the previous frame with the weighted initial minimum blob size for the video frame.

In some aspects, a blob includes pixels of at least a portion of one or more foreground objects in the video frame.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 11 is a table that illustrates a comparison between the adaptive small object size derivation technique with other fixed sizes for detection rate FIG. 12 is a table that illustrates a comparison between the adaptive small object size derivation technique with other fixed sizes for tracking rate.

FIG. 13 is a table that illustrates a comparison between the adaptive small object size derivation technique with other fixed sizes for true positive rate.

FIG. 14 is a table that illustrates a comparison between the adaptive small object size derivation technique with other fixed sizes for false positive rate.

FIG. 15 is a is a table that illustrates a comparison between the adaptive small object size derivation technique with fixed size equal to 256.

DETAILED DESCRIPTION

Figure 1:
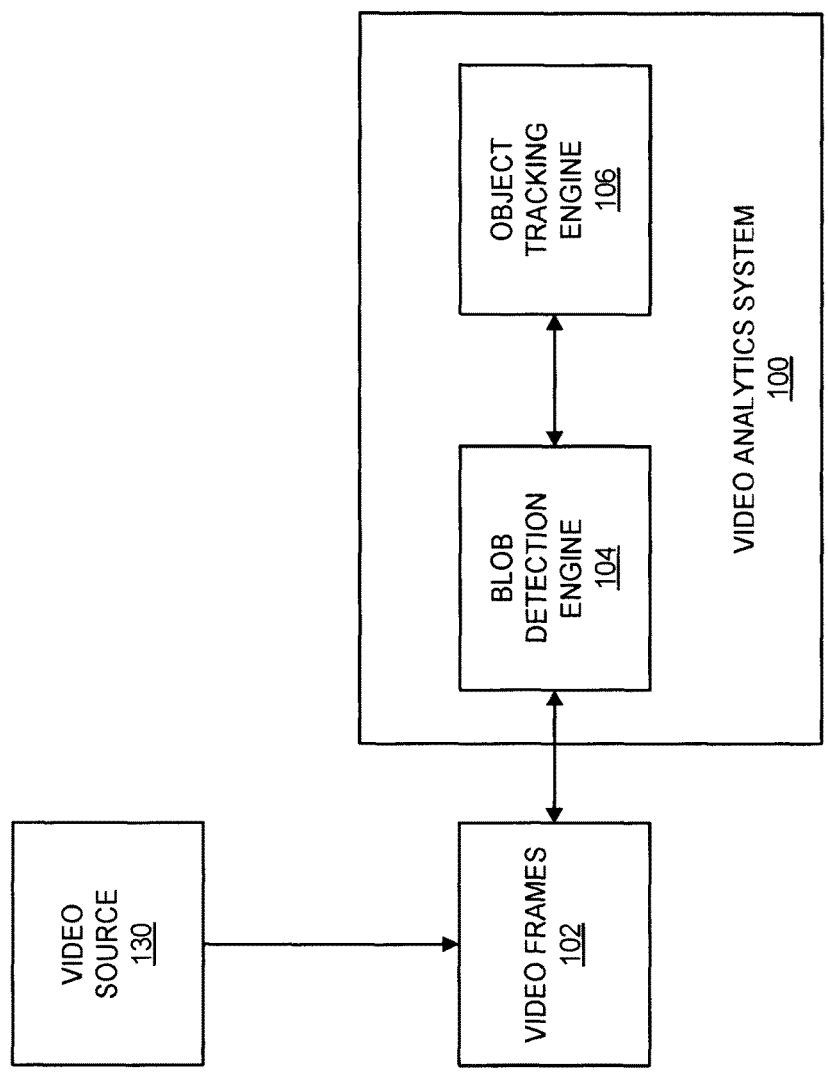
FIG. 1 is a block diagram illustrating an example of a system including a video source and a video analytics system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a video sequence from a video source and can process the video sequence to provide a variety of tasks. One example of a video source can include an Internet protocol camera (IP camera), or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of event of interest and sends an alert or alarm to a central control room to alert a user of the event of interest.

As noted previously, video analytics can generate and detect foreground blobs that are then used for object/blob detection and tracking. However, results from blob detection may be noisy so that the final object/blob detection accuracy, as well as the object/blob tracking accuracy can be low. Systems and methods are described herein for determining a minimum blob size that can be used as a blob size threshold for filtering blobs.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple 1P cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection engine 104 and an object tracking engine 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection engine 104 can detect one or more blobs in video frames (e.g., video frames 102) of a video sequence, and the object tracking engine 106 can track the one or more blobs across the frames of the video sequence. As used herein, a blob refers to pixels of at least a portion of an object in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding box can be associated with a blob. In some examples, a tracker can also be represented by a tracker bounding box. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the two-dimensional center of a bounding box of the tracker in a current frame, with $C_{tx}$ being the width of the bounding box, and $C_{ty}$ being the height of the bounding box. The term $C_{t-1}(C_{t-1x}, C_{t-1y})$ denotes the two-dimensional (horizontal and vertical) center of a bounding box of the tracker in a previous frame. In some cases, because the timing for video frame data is constant or at least not dramatically different over time (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection engine 104 and the object tracking engine 106, the video analytics system 100 can perform blob generation and detection for each frame or picture of a video sequence. For example, the blob detection engine 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection engine 104 and the object tracking engine 106 are described with respect to FIGS. 3, 4, and 5.

Figure 2:
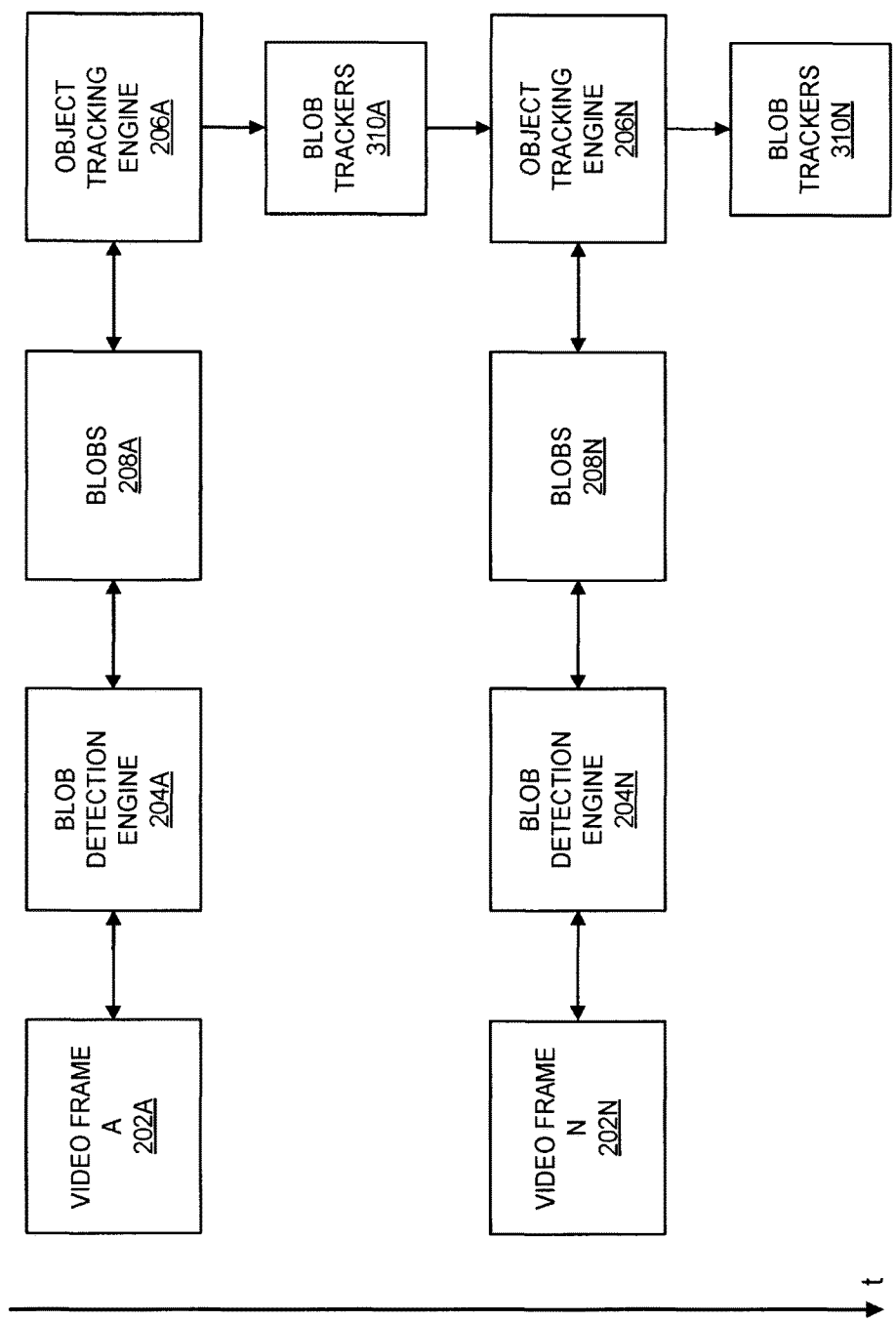
FIG. 2 is an example of a video analytics system processing video frames, in accordance with some embodiments.

FIG. 2 is an example of the video analytics system (e.g., video analytics system 100) processing video frames across time t. As shown in FIG. 2, a video frame A 202A is received by a blob detection engine 204A. The blob detection engine 204A generates foreground blobs 208A for the current frame A 202A. After blob detection is performed, the foreground blobs 208A can be used for temporal tracking by the object tracking engine 206A. Costs (e.g., a cost including a distance, a weighted distance, or other cost) between blob trackers and blobs can be calculated by the object tracking engine 206A. The object tracking engine 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers, including in terms of positions of the trackers, can be updated according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection engine 204N generates foreground blobs 208N for the frame N 202N. The object tracking engine 206N can then perform temporal tracking of the blobs 208N. For example, the object tracking engine 206N obtains the blob trackers 310A that were updated based on the prior video frame A 202A. The object tracking engine 206N can then calculate a cost and can associate the blob trackers 310A and the blobs 208N using the newly calculated cost. The blob trackers 310A can be updated according to the data association to generate updated blob trackers 310N.

Figure 3:
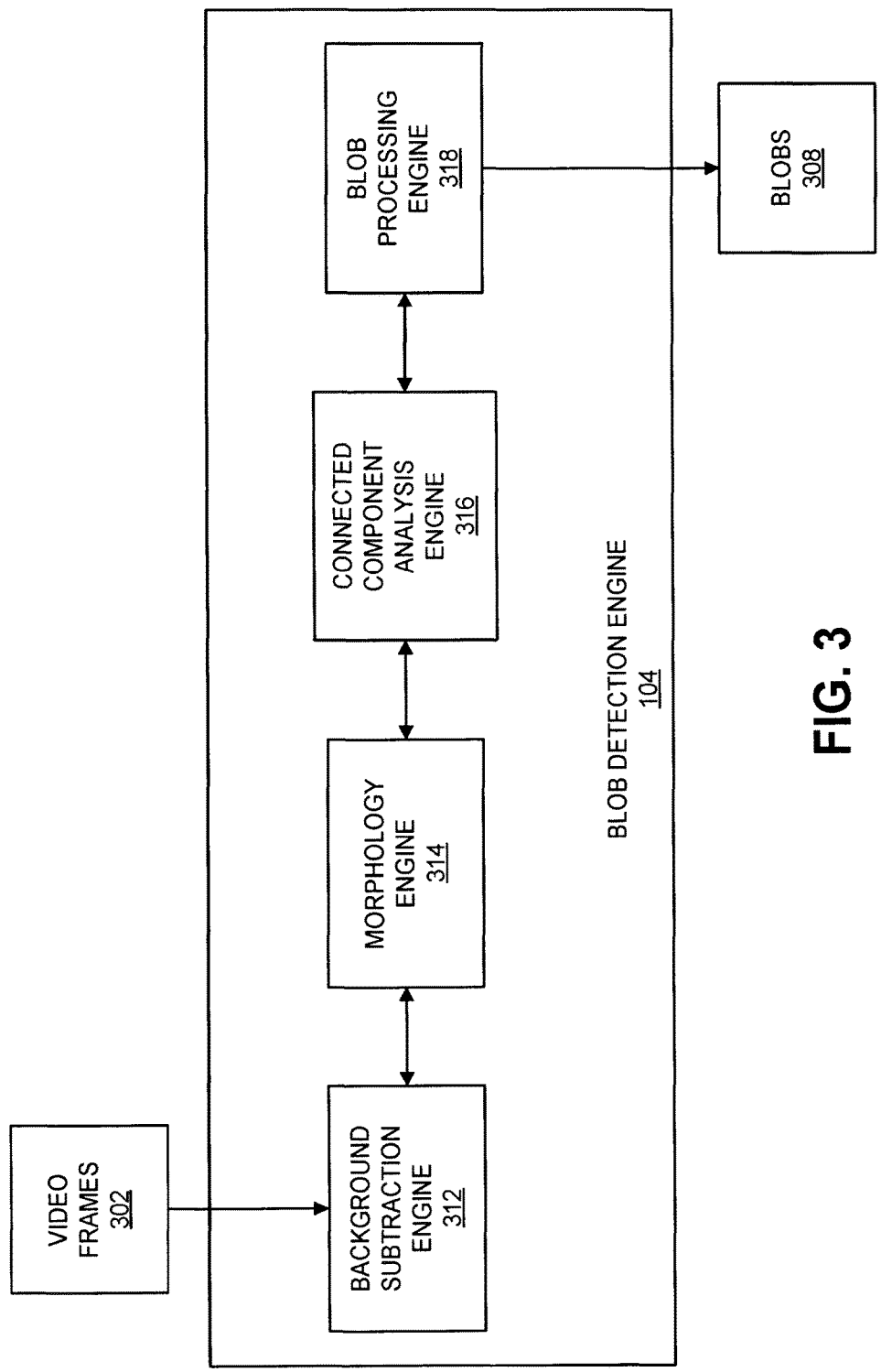
FIG. 3 is a block diagram illustrating an example of a blob detection engine, in accordance with some embodiments.

FIG. 3 is a block diagram illustrating an example of a blob detection engine 104. Blob detection is used to segment moving objects from the global background in a video scene. The blob detection engine 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (GMM). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N\left(X_t \mid \mu_{i,t}, \sum_{i,t}\right)$$ Equation (1)

An equation of the GMM model is shown in equation (1), wherein there are K Gaussian models. Each Guassian model has a distribution with a mean of $\mu$ and variance of $\Sigma$, and has a weight $\omega$. Here, i is the index to the Gaussian model and t is the time instance. As shown by the equation, the parameters of the GMM changes over time after one frame (at time t) is processed.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. One example of the connected component analysis performed by the connected component analysis engine 316 is implemented as follows:

for each pixel of the foreground mask {
  if it is a foreground pixel and has not been processed, the following steps apply:
    Apply FloodFill function to connect this pixel to other foreground and generate a connected component
    Insert the connected component in a list of connected component.
    Mark the pixels in the connected component as being processed}

The Floodfill (seed fill) function is an algorithm that determines the area connected to a seed node in a multidimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection engine 104. In some examples, the blob processing engine 318 can perform content-based filtering of certain blobs. For instance, a machine learning method can determine that a current blob contains noise (e.g., foliage in a scene). Using the machine learning information, the blob processing engine 318 can determine the current blob is a noisy blob and can remove it from the resulting blobs that are provided to the object tracking engine 106. In some examples, the blob processing engine 318 can merge close blobs into one big blob to remove the risk of having too many small blobs that could belong to one object. In some examples, the blob processing engine 318 can filter out one or more small blobs that are below a certain size threshold (e.g., an area of a bounding box surrounding a blob is below an area threshold). In some embodiments, the blob detection engine 104 does not include the blob processing engine 318, or does not use the blob processing engine 318 in some instances. For example, the blobs generated by the connected component analysis engine 316, without further processing, can be input to the object tracking engine 106 to perform blob and/or object tracking.

Figure 4:
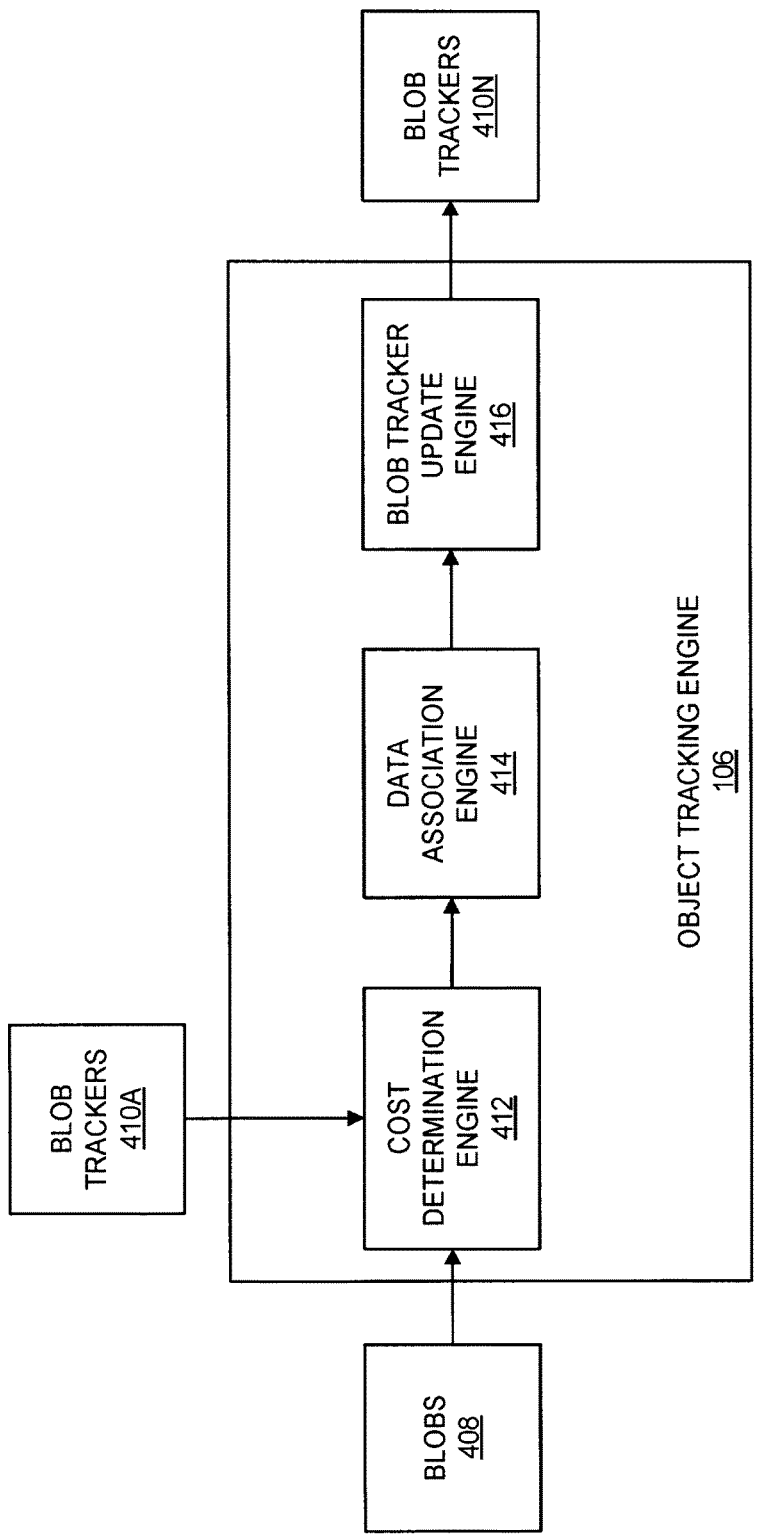
FIG. 4 is a block diagram illustrating an example of an object tracking engine, in accordance with some embodiments.

FIG. 4 is a block diagram illustrating an example of an object tracking engine 106. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking engine 106 can obtain the blobs 408 of a current video frame from the blob detection engine 104. The cost determination engine 412 can also obtain the blob trackers 410A updated from the previous video frame (e.g., video frame A 202A).

A cost function can then be used to calculate costs between the object trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$Cos_{tb} = \sqrt{(t_x - b_x)^2 + (t_y - b_y)^2}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker with a corresponding blob and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible.

Regardless of the association technique that is used, the data association engine 414 can rely on the distance between the blobs and trackers. The location of the foreground blobs are identified with the blob detection engine 104. However, a blob tracker location in a current frame may need to be predicated from a previous frame (e.g., using a location of a blob associated with the blob tracker in the previous frame). The calculated distance between the identified blobs and estimated trackers are used for data association. After the data association for the current frame, the tracker location in the current frame can be identified with its associated blob(s)' location in the current frame. The tracker's location can be further used to update the tracker's motion model and predict its location in the next frame.

Once the association between the blob trackers 410A and blobs 408 has been completed, the blob tracker update engine 416 can use the information of the associated blobs, as well as the trackers' temporal statuses, to update the states of the trackers 410A for the current frame. Upon updating the trackers 410A, the blob tracker update engine 416 can perform object tracking using the updated trackers 410N, and can also provide the update trackers 410N for use for a next frame.

The state of a blob tracker can includes the tracker's identified location (or actual location) in a current frame and its predicted location in the next frame. The state can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., 2 or more), or other suitable tracker states.

One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Other than the location of a tracker, there may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other object of interest) intersect, the two trackers associated with the two objects will be merged together for certain frames, and the merge or occlusion status needs to be recorded for high level video analytics.

As previously described, the blob detection engine 104 can perform background subtraction to generate a foreground mask for a frame, and can perform morphology operations to reduce noise present in the foreground mask. After morphology operations are applied, connected component analysis can be performed to generate connected components. After background subtraction and connected component analysis, blobs may be identified for objects in the current frame. In some cases, results from such a process may be noisy, leading to the final blob detection and also blob tracking having low accuracy. For example, noisy blobs may be generated that correspond to objects that appear to move, but that are part of the background. Noisy blobs can include, for example, trees, umbrellas, or other objects that move due to wind or other cause, shadows that change due to the movement of the sun, or other moving background objects. It is critical to know the size of a typical small blob that should be detected for a scene so that blobs that are smaller than the typical small blob size can be filtered out.

A stable and specific scenario-oriented video analytic system needs correct configurations and tuning for multiple modules to work together and to provide optimal end-to-end quality. An inability to accurately determine a typical small object size (also referred to as a minimum blob size) may lead to the various problems. For example, very small noisy blobs may be considered as real objects or as one or more components of real objects, which can lead to a huge amount of noise being detected by the video analytics system. Such noisy blobs may be caused by, for example (but not limited to), wind that causes foliage and other static objects in the scene move, shadows, slight and even local lighting changes, video coding artifacts and/or distortion, camera shaking, or any other cause. Such noisy objects will not only increase the chance that a false alarm may be generated, but may also interfere with real objects in the scene and thus may reduce the accuracy and precision of detecting and tracking the real objects.

Furthermore, a smallest object size of a scene can be set as a size threshold, which can be critical in terms of removing noisy blobs. However, a smallest object size threshold may not solve the problem completely. For example, if the smallest object size is too small, some noisy blobs may not be removed because they are larger than the smallest object size, leading the whole video analytics system to produce noisy and inaccurate results (e.g., with more false alarms due to detection and tracking of the noisy objects). On the other hand, if the smallest object size is too big, real objects may be removed in a filtering process that depends, at least in part, on the smallest object size. In some cases, the smallest object size can be specifically set (e.g., manually for each video clip or each scene when a camera is setup). However, setting the smallest object size threshold can require much operation overhead, either from the simulation and validation perspective and/or from the user experience perspective.

Figure 5:
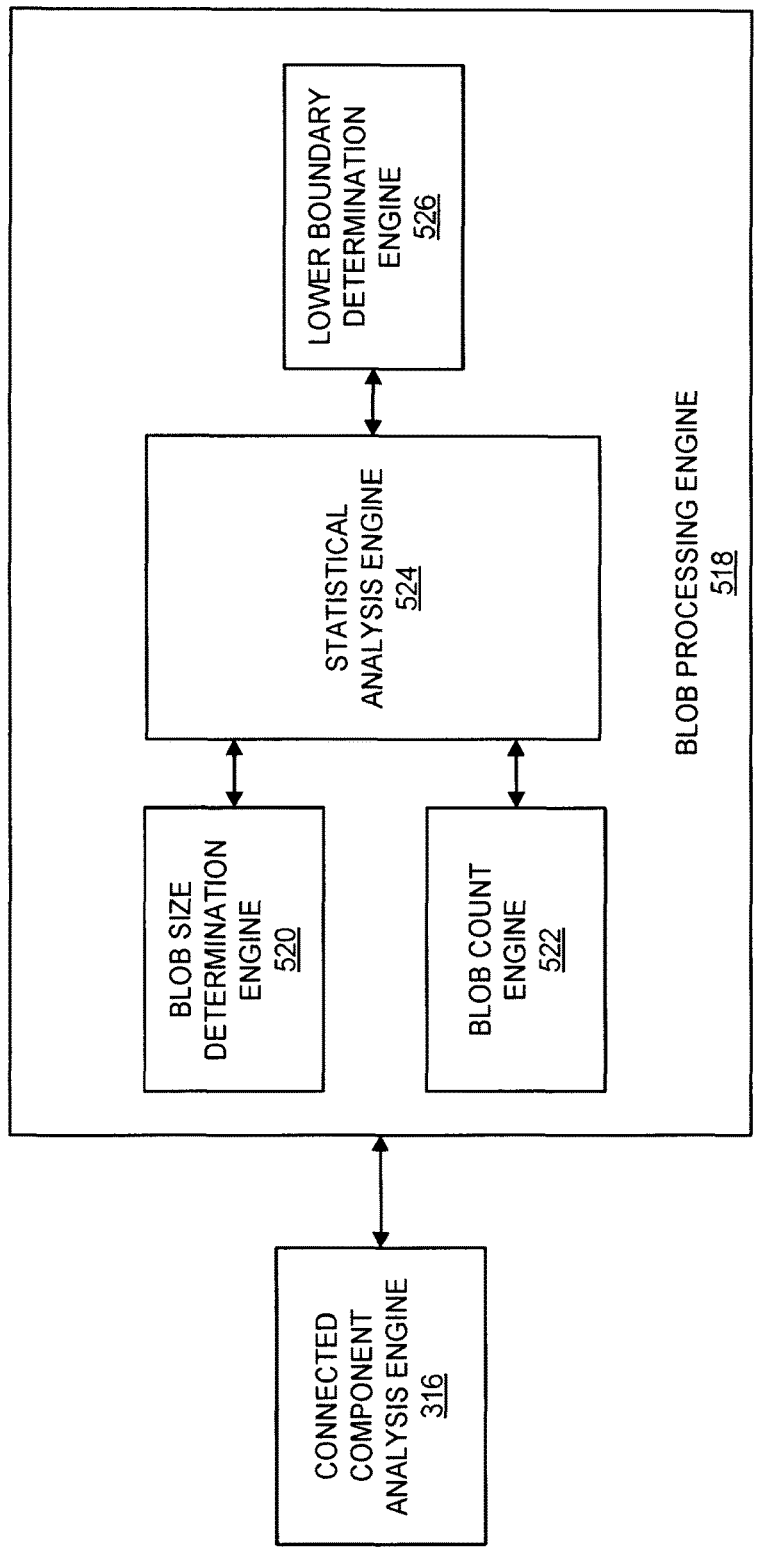
FIG. 5 is a block diagram illustrating an example of a blob processing engine including components for determining a minimum blob size, in accordance with some embodiments.

Systems and methods of blob filtering are described. FIG. 5 is a block diagram illustrating an example of a blob processing engine 518 that can implement the blob filtering methods described herein. The blob processing engine 518 includes a blob size determination engine 520, a blob count engine 522, a statistical analysis engine 524, and a lower boundary determination engine 526. The blob processing engine 518 performs adaptive small object size derivation to determine a minimum blob size for each frame. The minimum blob size for a given frame can be used as a blob size threshold for filtering blobs generated for the given frame. The adaptively determined blob size threshold further reduces and possibly removes noisy blobs.

In some examples, as part of the video analytics process (e.g., during blob processing), the adaptive small object derivation method can be performed after the blobs are initially formulated, without any filtering, merging, or other processes. For example, after background subtraction and connected component analysis (CCA) is performed to formulate the initial blobs, the minimum size resulting from the proposed method (e.g., represented as the size in terms of pixels) can be derived based on the initial blobs and can be used to filter the blobs, regardless of how many steps of filtering, before or after blob merging. By providing an accurate adaptive small object size derivation-based blob size threshold, the blob detection and tracking rates of the video analytics system is greatly enhanced. The proposed techniques may work independently or jointly.

Various assumptions can be made when performing the method. For example, noise blobs are considered to be smaller than real blobs corresponding to real foreground object. Further, there are assumed to be three categories of objects in terms of size, including: a first category that includes big objects which can correspond to cars, objects that are very close to the camera, or other foreground objects with big sizes; a second category that includes small objects (e.g., persons, or other smaller objects of interest), objects that are relatively far from the camera, or other foreground objects with small sizes; and a third category that includes noisy blobs that are smaller than the smallest size of the second category objects. However, one of ordinary skill will appreciate that more or fewer than three categories of objects, in terms of size, can be used without departing from the scope of this description. Further, as described in more detail below, the smallest size of the second category of objects (small foreground objects) is set as the initially derived object size.

In some examples, even though it is assumed that sizes fall into three general size categories, it is possible that there is no clear boundary of two neighboring size categories, in which case two or more size categories may be merged into one category. In some examples, when the size distributions are relatively converged, the system may distinguish multiple categories and generate a new category of blob sizes.

A smaller number of blobs typically corresponds to a smaller number of noisy blobs and/or better error resiliency for the detection accuracy of real objects. While the number of blobs can be large, it can be assumed that the percentage of such noisy blobs should be limited. Since the distribution of noisy blobs are temporally inconsistent, the initially derived object size can be temporally filtered to make the system stable.

The blob processing engine 518 can perform the small object size derivation for each frame of a video sequence to determine a minimum blob size for each frame. For example, the blob size determination engine 520 determines the size of all blobs generated for a current frame and the blob count engine 522 determines the number of blobs generated for the current frame. A current frame refers to the frame currently being processed. A size of a blob can be defined using one or more techniques. In one example, the size of a blob can be defined as the size of its bounding box, in which case the blob size can be determined by calculating the area of the bounding box associated with the blob (e.g., a width of the bounding box multiplied by a height of the bounding box). In another example, the size of a blob can be defined as the number of foreground pixels in the blob, in which case the size of a blob can be determined by counting the number of pixels that make up the blob.

The size of the blobs and the number of blobs for the current frame are provided to the statistical analysis engine 524. The statistical analysis engine 524 can generate a histogram (denoted as His(x)) with possible blob sizes (including the actual blob sizes) and the number of blobs in the current frame with each possible blob size. In some examples, the possible blob sizes of the blobs can be quantized to formulate the histogram. Quantizing the blob sizes can avoid sorting of the size values and can reduce the amount of memory used for the histogram and thus also the whole statistical analysis engine 524. The possible blob sizes can be quantized using any suitable quantization technique. In one example, a size can be quantized as follows: $x=s/q$, wherein s is the size of the blob, and q is a quantization step. In another example, a size can be quantized as follows: $x=(s+q/2)/q$. For instance, the quantization step q can be set to 64, and the above division can be converted to right shift. In another example, a quantization scheme can quantize a size as follows: $x=(\sqrt{s}+q/2)/q$. In some examples, after quantization, the quantized value x can be further clipped to save memory (in terms of size) needed to store the histogram. For example, the quantized values of x can be clipped to [0, 255] or other suitable range of values. In such an example, blob sizes exceeding a certain value (e.g., 255×64) can be treated as if the blobs have that certain size value. Rationale for clipping include that such huge blobs will not impact the results of the whole method.

The possible blob sizes (e.g., quantized blob sizes) in the histogram are denoted as x. A possible blob size x can also be referred to herein as a bin of the histogram. Each possible blob size x can be an index to the histogram, with each possible blob size x corresponding to a position in the histogram. As described in more detail below, each possible blob size x is a candidate position for a cut (defined with a lower boundary value) to define a category of blob (object) sizes. For example, the lower boundary determination engine 526 can check each possible blob size x against one or more conditions (described below). If the one or more checks or conditions are satisfied by a current possible blob size x, then the possible blob size x is defined as a lower boundary. If the one or more conditions are not satisfied for the current possible blob size x, the lower boundary determination engine 526 moves to a smaller possible blob size x and continues checking the one or more conditions for each new possible blob size x.

In some examples, a probability density function (PDF) can be calculated from the histogram of quantized sizes. A modified cumulative distribution function (CDF) can then be calculated based on the PDF. The modified CDF includes the possible blob sizes and, for each possible blob size x, a number of blobs for the current frame having a size larger than the possible blob size x. The modified CDF is a modification of a traditional CDF in that the range of the CDF is from top to bottom instead of bottom to top. Hence, the iterative process for determining a minimum blob size described below is performed from the highest possible blob size x values to the lowest possible blob size x values. In some examples, the PDF can be defined as $pdf(x)=His(x)$, and the CDF can be defined as $cdf(x)=\Sigma_{i=x}^{+\infty} pdf(i))$. In some cases, if the quantized possible blob sizes x have been clipped, the term $+\infty$ in the CDF can be replaced with the value (quantized or non-quantized) used for clipping, which is denoted as M+1. For example, the term M can be 255 or other suitable value. Note that $cdf(M+1)$ is equal to 0.

The information in the histogram can be analyzed to identify lower boundaries (denoted herein as target lower boundary tlb) of one or more of the categories of objects described above, including the first big blobs/object category, the second small blobs/objects category, and the third noisy blobs/objects category. For example, a category includes the blob sizes from a target lower boundary tlb up to either the maximum number of x (which is M) for a first category or the last determined target lower boundary tlb for a subsequent category. In some examples, an iterative process of analyzing the possible blob sizes x from the maximum number of x (which is M) to the minimal size 0 (e.g., according to the CDF) is invoked to derive one or more lower boundaries.

When three categories are used, the iterative process may be invoked twice to identify the target lower boundary tlb of the second small object category relating to small blobs/objects (and thus the minimum blob size). Once the target lower boundary tlb of the second small object category is found, the minimum blob size (or typical small object size) can be determined based on the blob size x at that target lower boundary tlb. For example, the blob size x at the second lower boundary corresponds to the last remaining small object size in the second category before the noisy blobs, due to the blobs in the third category being the only blobs remaining after the second lower boundary is found.

The lower boundary determination engine 526 can implement the iterative process to determine a possible blob size x in the histogram as a target lower boundary tlb of a category. For example, using the iterative process starting from a value of x denoted as a (the starting point a can be either M+1 or the lower boundary of the previously identified lower boundary of a category), the lower boundary determination engine 526 can iteratively analyze each possible blob size x value to determine if a possible blob size x value qualifies as a new target lower boundary tlb. A possible blob size x value can be identified as a new target lower boundary tlb if one or more of a number of conditions are met for the possible blob size x. The conditions can be referred to herein as lower boundary conditions. While example lower boundary conditions are described below, one of ordinary skill will appreciate that other suitable conditions can be used to determine a target lower boundary tlb.

A first condition for determining a target lower boundary tlb can be based on a number of blobs between a current possible blob size x position in the histogram and the starting point a of a current blob category (either M+1 or the lower boundary of the previously identified lower boundary of a category). If the number of blobs is higher than a threshold, the current possible blob size x is identified as the target lower boundary tlb. For example, the first condition can include that a number of blobs are detected in a target current category $cdf(x)-cdf(a)$, specifying the target lower boundary tlb is equal to x. In some examples, the number of blobs detected in the target current category can be compared with a blob number threshold $T_o$ (including a threshold number of blobs) to determine if the condition is met. For example, the blob number threshold $T_o$ can be set as a small value, such as 2 blobs, 4, blobs 5 blobs, or any other suitable number. In one illustrative example, at a current possible blob size x position of the histogram, if there are more than the threshold $T_o$ number of blobs between the possible blob size x position and the upper boundary of the current blob category (either M or the last determined lower boundary), the blob size x is determined as the target lower boundary tlb.

In some examples, the number of blobs detected in the target current category $cdf(x)-cdf(a)$ can be compared with a threshold $T_p$*totalNumLeftBlobs, wherein totalNumLeftBlobs is the total number of blobs left. For example, the blob percentage threshold $T_p$ can be set as any suitable percentage (such as 10%, 15%, 20%, 25%, or any other suitable percentage) of the remaining blobs that can be included in the target current category. In some examples, the term totalNumLeftBlobs can be calculated as $cdf(0)-cdf(a)$, including the possible number of blobs that can be included in the target current category. In some examples, if totalNumLeftBlobs is smaller than a value N, the value for totalNumLeftBlobs is set to be N. N can be set to a relatively larger value (e.g., 10, 11, 12, 13, or other suitable value). In one illustrative example, for current possible blob size x position of the histogram, if there are more than a threshold percentage $T_p$ of the total number of blobs left (e.g., more than 25%) between the possible blob size x position and the upper boundary of the current blob category (either M or the last determined lower boundary), the blob size x is determined as the target lower boundary tlb.

A second condition for determining a target lower boundary tlb can be based on a size gap from a current possible blob size x position with a positive histogram value to a next possible blob size x position (denoted as x') with a positive histogram value. A positive histogram value for a possible blob size x position indicates that at least one blob exists at that size for the current frame. The next possible blob size x position (x') corresponds to a smaller blob size due to the iterative process starting from the highest possible blob size x values and iteratively working down to the lowest possible blob size x values. If the size gap is larger than a size gap threshold, the current possible blob size x is identified as the target lower boundary tlb. For example, the second condition can include that a next available position x' in the histogram satisfies $pdf(x')>0$, $x'<x$ and $pdf(y)=0$, for any $y>x'$ and $y\leq x$. The second condition for the current possible blob size x being qualified as a target lower boundary tlb can be based on a gap threshold defined as a gap from the current position x to a next available position x' with a size value that is smaller than $x*T_r$ (denoted as $x'<x*T_r$). The threshold $T_r$ may be set to a relatively small number (e.g., 0.1, 0.25, or other suitable value) so that the gap between x and x' can meaningfully represent a lower boundary, assuming the biggest blob in one category (e.g., the small object category) is quite smaller than the smallest blob in another adjacent but larger category (e.g., the big object category). For example, the smaller the value of x', the larger the gap between x and x'. The size gap threshold can thus include a gap size between a current x value and a next available x' that satisfies $x'<x*T_r$.

A third condition for determining a target lower boundary tlb can be based on the number of bins left in the histogram, which is the value of x itself. For example, if the current value of the possible blob size x is 10 (e.g., corresponding to a quantized size of 10), there will be 10 bins left in the histogram to analyze. As noted above, a bin corresponds to a possible blob size x. In some examples, the number of bins left (the current x value) can be compared to a threshold number of bins. For example, the possible blob size x can be qualified as a tlb when the number of bins left (the current x value) is smaller than a bin threshold $T_b$, wherein the bin threshold $T_b$ could be set as a small value, such as 3 bins, 4 bins, 5 bins, 6 bins, or other suitable value.

If any of the lower boundary conditions are satisfied for a given possible blob size x position in the histogram, the target lower boundary tlb is set to the possible blob size x. In some examples, if none of the lower boundary conditions are satisfied for a possible blob size x, two or more of the conditions can be combined and a joint evaluation is performed for the possible blob size x based on the combined conditions. In one example, the joint evaluation can include:

$$R_{sum} = \frac{T_b}{x} + \frac{cdf(x) - cdf(a)}{T_o} + \frac{cdf(x) - cdf(a)}{T_p * \text{Max}(cdf(0) - cdf(a), N)} + \frac{x \cdot T_r}{x'},$$

where $$\frac{T_b}{x}$$

is the bin threshold divided by the number of bins left, $$\frac{cdf(x) - cdf(a)}{T_o}$$

is the number of blobs in the current target category (between the current value of x and the starting point a) divided by the blob number threshold $$T_o, \frac{cdf(x) - cdf(a)}{T_p * \text{Max}(cdf(0) - cdf(a), N)}$$

is the number of blobs in the current target category divided by a product of the blob percentage threshold $T_p$ multiplied by the maximum value between the total number of blobs left and a pre-determined N value (e.g., 10, 11, 12, 13, or other suitable value), and $$\frac{x \cdot T_r}{x'}$$

is the current possible blob size x times the threshold $T_r$ divided by the next available position x' that satisfies pdf (x')>0, x'<x and pdf(y)=0, for any y>x' and y≤x.

When the $R_{sum}$ for a current possible blob size x is larger than a threshold T, the target lower boundary tlb is set to the possible blob size x. The threshold T can be set to any suitable value, such as 1.25, 1.5, 1.75, or other suitable value.

Each iteration of testing the possible blob sizes x through the clipped value (e.g., 255) terminates when a possible blob size x qualifies as a target lower boundary tlb, thus determining the current target category. If the assumption is that three typical size categories are available, up to two iterations will be performed. For example, once two target lower boundaries are determined (one for the first category and one for the second category), the only remaining blobs are noise blobs (of the third category). Hence, the target lower boundary tlb of the second small object category is found after two lower boundary determinations. One of ordinary skill will appreciate that more or less than three size categories of objects can be used, and that the number of lower boundary determinations needed to find the minimum blob size may change as the number of categories changes. For example, more than two iterations can be performed or only one iteration can be performed.

The minimum blob size (also referred to as the initial typical small size) is determined as the blob size x value at the target lower boundary tlb of the second small object category. In some examples, the blob size x value at the target lower boundary tlb can be un-quantized, and the un-quantized value can be used as the minimum blob size. For example, the last derived target lower boundary tlb is a quantized size (the possible blob size x). The quantized size can be mapped to an un-quantized size dequ(tlb), which can be determined as tlb*quantization step. For example, if the quantization step is 64, a possible blob size x value of 2 that is determined to be a target lower boundary tlb can be multiplied by 64 to determine an un-quantized size dequ(tlb) of 128 pixels. The minimum blob size (or initial typical small size) of the current frame t can then be set as the un-quantized size dequ(tlb). The minimum blob size is denoted as $S_i^t$. In some examples, the minimum blob size $S_i^t$ can be used as the minimum blob size threshold, and blob filtering can be designed based on the minimum blob size threshold $S_i^t$. For example, in some cases, blobs smaller than the minimum blob size threshold $S_i^t$ can be filtered from the blobs generated for the current frame.

In some embodiments, the minimum blob size ($S_i^t$) of the current frame t can be temporally filtered to produce a final minimum blob size $S_o^t$ (also referred to as a final small object size) of the current frame. In such examples, the final minimum blob size $S_o^t$ can be used as the minimum blob size threshold, in which case blobs smaller than the final minimum blob size $S_o^t$ can be filtered from the blobs generated for the current frame. The final minimum blob size of a current frame can be defined as $S_o^t = (w-1)S_o^{t-1} + wS_i^t$, where the term w is a weighting factor adaptively selected for each frame, $S_o^{t-1}$ is the final minimum blob size of a previous frame, and $S_i^t$ is the initial minimum blob size of the current frame.

Temporally filtering the minimum blob size based on temporal information of prior frames can make the minimum blob size threshold more stable so that the minimum blob size does not fluctuate too quickly. One reason for performing temporal filtering is to make the results of blob filtering tend to be more temporally consistent, which can avoid flickering of the detected bounding boxes. For example, when object tracking is performed, temporal consistencies need to be maintained so that bounding boxes will not randomly appear in only certain frames due to a rapidly fluctuating minimum blob size threshold (e.g., show up in a first frame, not in second frame, show up in a third frame, not in a further frame, and so on). By determining the final minimum blob size as $S_o^t = (w-1)S_o^{t-1} + wS_i^t$, both the initial size of the current frame $S_i^t$ (weighted by the weighting factor w) and the final minimum blob size of the previous frame ($S_o^{t-1}$) (weighted by the weighting factor w, but less so than the initial size of the current frame $S_i^t$) contribute to the final small object size of the current frame ($S_o^t$).

In various examples, the weighting factor w can be determined based on one or more factors, such as the number of blobs of the current frame, the number of blobs of the previous frame (thus also the information of whether the number of blobs increases or decreases compared to the previous frame), whether the initial size of the current frame ($S_i^t$) is larger than the final small object size of the previous frame ($S_O^{t-1}$), or any combination thereof. For example, if the number of blobs increases significantly compared to the previous frame, the increase may indicate that the current frame is noisy. In such an example, the transition of the minimum blob size towards $S_i^t$ can be made much slower (with a larger value of w). In another example, if the number of blobs decreases significantly, the decrease may indicate the current frame has less noise, in which case the transition of the minimum blob size towards $S_i^t$ will be made much faster (with a larger value of w). In some examples, depending on whether the number of blobs increased, whether the size is to be increased, or whether the numbers of blobs are in a certain level, the weighting factor w may be set as the default value being slightly increased or decreased by 1 or other incremental value. The default value of w can be set to any suitable value. For example, the default value can be set as a relatively conservative value so that the adaptation to a newer size could take a number of frames (e.g., 15 frame) or a certain amount of time (e.g., half a second). In one illustrative example, an initial weighting factor value w can be denoted as WEIGHT_FACTOR_LOG2 (as indicated in the pseudo code provided below for deriving the final small object size $S_o^t$). A final weight factor value ws can be determined based on various factors, and in some cases can be determined in three dimensions [i][j][k], with each dimension slightly increasing or decreasing the weight value ws on top of the initial value w. For example, as shown in the pseudo code, the three dimensions and a final weighting value can be calculated as: jIdx=($Num_b^t$>$Num_b^{t-1}$)? 1:0; kIdx=($S_i^t$>$S_o^{t-1}$)? 1:0; iIdx=(MAX($Num_b^t$, $Num_b^{t-1}$)>$N_m$)? 1:0; and ws=aWFLog2[iIdx][jIdx][kIdx]. For instance, an example set of pseudo code (provided in more below) can include:

```
Initialize aWFLog2[2][2][2];
    w = WEIGHT_FACTOR_LOG2;
    for ( i = 0; i < 2; i++) //number of bbs big or small
        for ( j = 0; j < 2; j++) //number of bbs increased or decreased
            for ( k = 0; k < 2; k++) //number object size increased
                aWFLog2[i][j][k] = WEIGHT_FACTOR_LOG2;
    aWFLog2[1][1][1] -= 1; aWFLog2[1][1][0] += 1;
    aWFLog2[1][0][1] -= 1;
    aWFLog2[0][0][0] +=1;
//default ones: aWFLog2[1][0][0] ; aWFLog2[0][1][1] aWFLog2[0][1][0]
aWFLog2[0][0][1]
```

The final weight factor can then be calculated as follows:

```
Denote the number of blobs in the frame t as Num_b^t
    for ( i = 0; i < 2; i++) //number of bbs big or small
        if (Num_b^t > Num_b^{t-1}*2. && (Num_b^{t-1}>N_s || Num_b^t>N_b))
    //different level of numbers, increase weight by 2
        ws += 2;
    else if (Num_b^{t-1}.> Num_b^t*2 && (Num_b^t>N_s || Num_b^{t-1}>N_b))
    //different level of numbers, decrease weight by 2
        ws -= 2;
```

```
else // in the same level of numbers
    {
    jIdx = (Num_b^t> Num_b^{t-1}) ? 1 : 0;
    kIdx = (S_i^t>S_o^{t-1}) ? 1 : 0;
    iIdx = (MAX(Num_b^t, Num_b^{t-1}) > N_m) ? 1 : 0;
    ws = aWFLog2[iIdx][jIdx][kIdx];
    }
```

Note that here, a factor of 2 is used to distinguish whether $Num_b^t$ (number of blobs for the current frame) is quite different from the $Num_b^{t-1}$ (number of blobs for the previous frame). In some examples, any other ratios can be used to decide whether the numbers of blobs in the current and previous frame are quite different or belong to the same level. When the number of blobs of the current frame is quite different from that of that the previous frame (according to the factor used, such as 2), the ws may be changed significantly from the default value w. Otherwise, the characteristics of the three dimensions [i][j][k] may jointly determine how the weighting factor can be set. An example default value of the ws is 4, in which case by default the current size contributes about 1/16 of the total weight, and it could be as small as 1/4 and as large as 1/64 depending on the factors or conditions.

Using the techniques described above, the blob processing engine 518 can perform adaptive small object size derivation to determine a minimum blob size for each frame of a video sequence. The uniquely identified minimum blob size threshold for each frame can then be used as a blob size threshold for filtering blobs from the blobs generated for each frame. An illustrative example will now be described with respect to FIG. 6A-FIG. 9B, using the techniques described above.

Figure 6A:
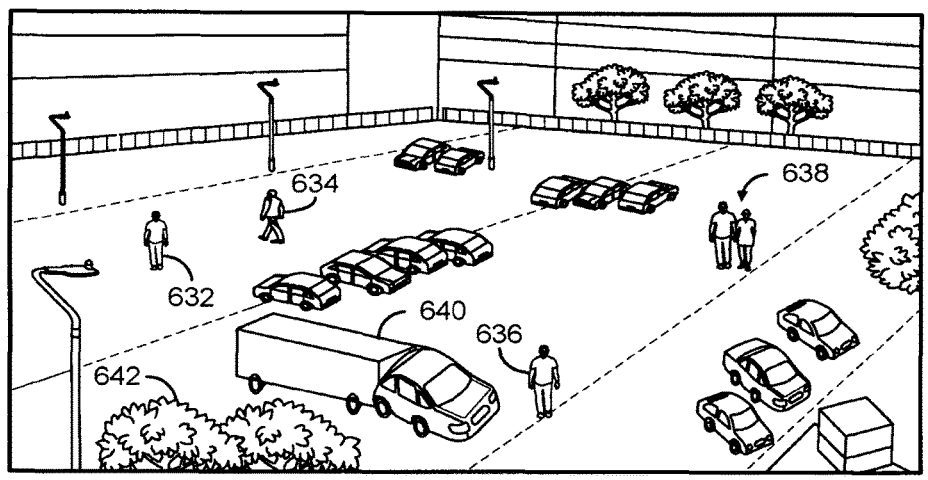
FIG. 6A is an illustration of a video frame capturing a scene with various objects.

FIG. 6A illustrates an example of a video frame 600A of a scene with various objects. Foreground objects captured in the video frame include a person 632, a person 634, a person 636, two persons 638, and a truck 640. The scene also includes background objects, such as a tree 642. The blob detection engine 104 can detect blobs in the video frame 600A for the various objects. For example, the blob detection engine 104 can perform background subtraction for the frame 600A, and can detect foreground pixels in the frame 600A. Foreground blobs can then be generated from the foreground pixels using morphology operations and connected component analysis, as previously described.

Figure 6B:
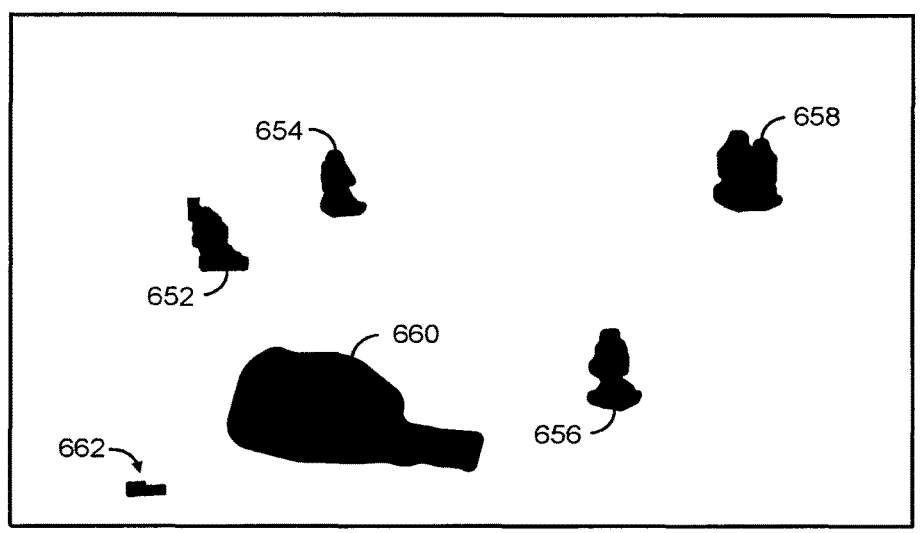
FIG. 6B is an illustration of a foreground mask of the frame with blobs detected for the objects, in accordance with some embodiments.

FIG. 6B illustrates an example of a foreground mask 600B of the video frame 600A.

The foreground mask 600B includes detected blobs for the foreground objects in the scene captured by the video frame 600A. For example, blob 652 is detected for person 632, blob 654 is detected for person 634, blob 656 is detected for person 636, blob 658 is detected for the persons 638, and blob 660 is detected for truck 640. In some cases, the blob detection can result in noisy blobs being generated that correspond to objects that appear to move, but that are part of the background. For example, noisy blob 662 is generated for a portion of the tree 642 that is detected as moving by the background subtraction engine.

The blob processing engine 518 can perform the techniques described herein to adaptively determine a blob size threshold for the frame 600A so that blobs that are smaller than the threshold can be filtered out. In this example, there are assumed to be three categories of objects in terms of size, including a big blob (object) category, a small blob (object)

category, and a noisy blob (object) category with blobs that are smaller than the smallest size of the second category objects.

The blob count engine 522 determines that there are six blobs generated for the frame 600A. In one example, the number of blobs generated for the frame can be based on a counter incremented during the blob generation process (e.g., by counting a number of connected components as they are generated in real-time or near real-time). One of ordinary skill will appreciate that any other suitable method for determining a number of blobs can be used. The blob size determination engine 520 determines the size of the blobs 652, 654, 656, 658, 660, and 662 generated for the frame 600A. The sizes can be determined by measuring the width times the height of a bounding box for each blob, by counting the number of pixels contained in each blob, or any other suitable approach. For example, the size of blob 652 is determined to be 128 pixels, the size of the blob 654 is determined to be 128 pixels, the size of the blob 656 is determined to be 128 pixels, the size of the blob 658 is determined to be 192 pixels, the size of the blob 660 is determined to be 704 pixels, and the size of the noisy blob 662 is determined to be 64 pixels. The blob sizes are quantized prior to being provided to the statistical analysis engine 524. For example, the quantized size of the blob 652 is determined to be $$2\left(\frac{128}{64}\right),$$

the quantized size of the blob 654 is determined to be $$2\left(\frac{128}{64}\right),$$

the quantized size of the blob 656 is determined to be $$2\left(\frac{128}{64}\right),$$

the quantized size of the blob 658 is determined to be $$3\left(\frac{192}{64}\right),$$

the quantized size of the blob 660 is determined to be $$11\left(\frac{704}{64}\right),$$

and the quantized size of the noisy blob 662 is determined to be $$1\left(\frac{64}{64}\right).$$

Figure 7A:
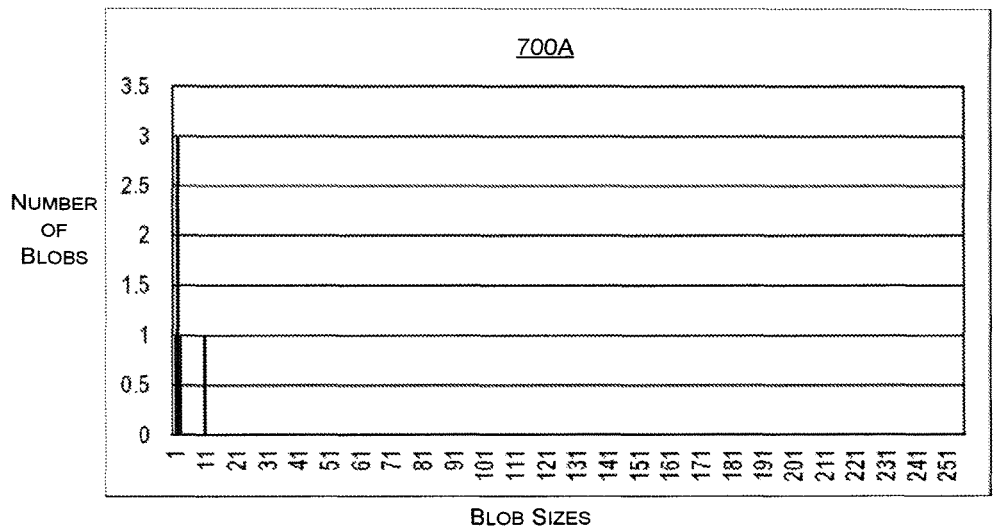
FIG. 7A is a histogram of blob sizes of the blobs shown in FIG. 6B, in accordance with some embodiments.
Figure 7B:
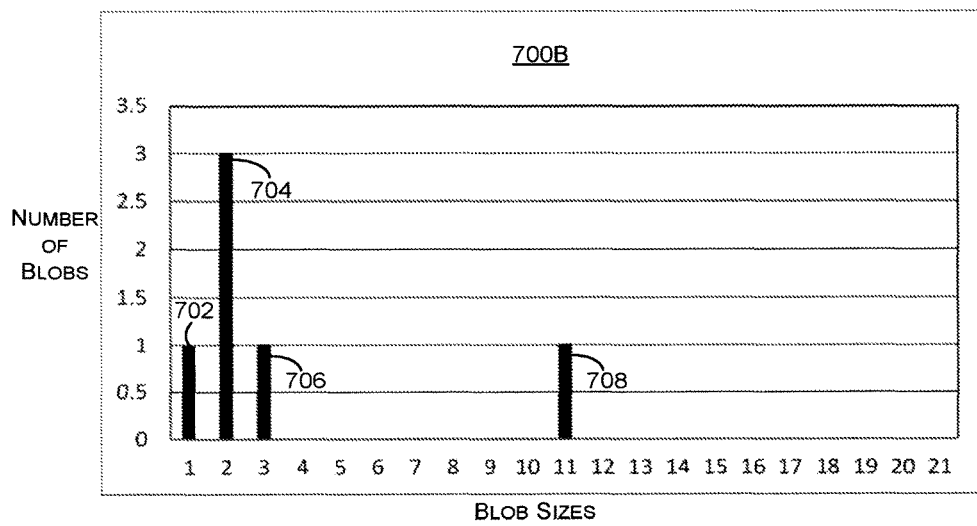
FIG. 7B is a zoomed-in view of the histogram of blob sizes of the blobs shown in FIG. 6B, in accordance with some embodiments.

The sizes of the blobs and the number of blobs for the frame 600A are provided to the statistical analysis engine 524. The statistical analysis engine 524 generates a histogram 700A shown in FIG. 7A. The x-axis of the histogram 700A includes all possible blob sizes (including the actual blob sizes of the blobs shown in FIG. 6B) up to a clipped value of 255. Each x-axis value is referred to as a possible blob size x value or a bin. The y-axis of the histogram 700A includes the number of blobs detected in the frame 600A for each possible blob size x value. FIG. 7B illustrates a zoomed-in histogram 700B that shows a zoomed-in view of the histogram 700A. As shown in the zoomed-in histogram 700B, bar 702 indicates that one blob is detected for the possible blob size x value of 1 (corresponding to noisy blob 662), bar 704 indicates that three blobs are detected for the possible blob size x value of 2 (corresponding to blobs 652, 654, and 656), bar 706 indicates that one blob is detected for the possible blob size x value of 3 (corresponding to blob 658), and bar 708 indicates that one blob is detected for the possible blob size x value of 11 (corresponding to blob 660).

Figure 8A:
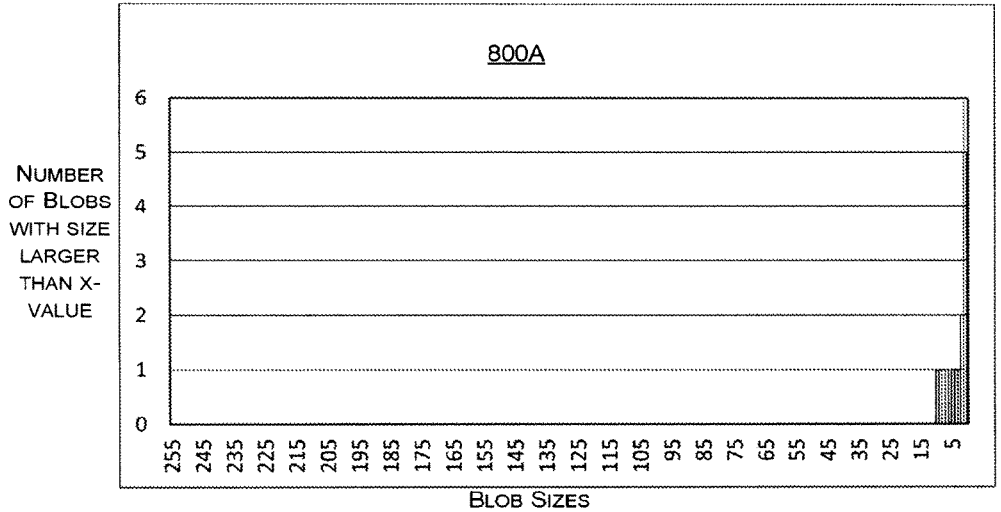
FIG. 8A is a cumulative distribution function of blob sizes of the blobs shown in FIG. 6B, in accordance with some embodiments.
Figure 8B:
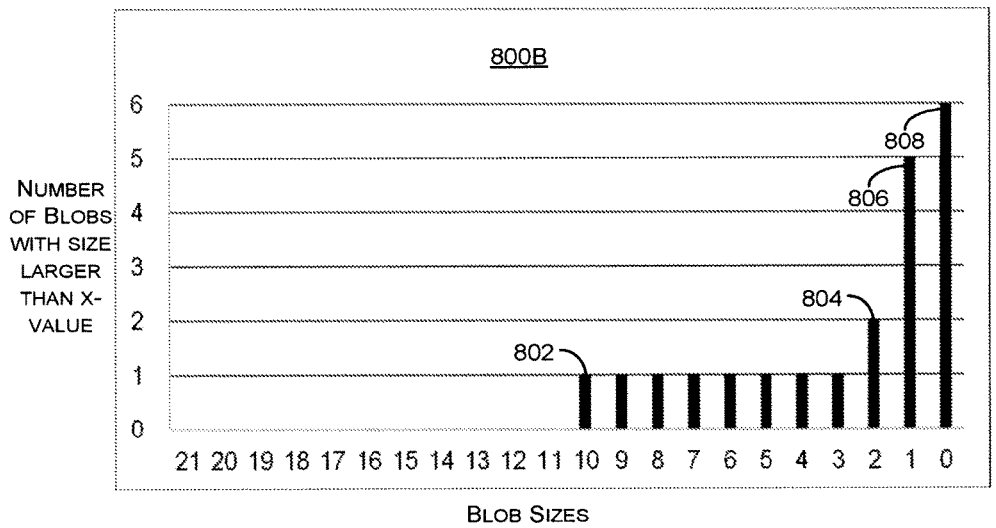
FIG. 8B is a zoomed-in view of the cumulative distribution function of blob sizes of the blobs shown in FIG. 6B, in accordance with some embodiments.

The statistical analysis engine 524 generates a probability density function (PDF) from the histogram 700A of quantized sizes. Using the PDF of the histogram, the statistical analysis engine 524 generates the modified cumulative distribution function (CDF) 800A of blob sizes shown in FIG. 8A. FIG. 8B is a zoomed-in CDF 800B that shows a zoomed-in view of the CDF 800A. The CDF 800A is defined as $cdf(x)=\Sigma_{i=x}^{M} pdf(i))$, with M being equal to 255 in this example. The x-axis of the modified CDF 800A includes the possible blob size x values from the histogram 700A, but in a reverse order (from 255 to 0). The y-axis of the modified CDF 800A includes, for each possible blob size x value, a number of blobs for the frame 600A having a size larger than each possible blob size x value. For example, bar 802 of the zoomed-in histogram 700B indicates that one blob detected for the frame 600A has a size larger than a quantized size of 10 (corresponding to the blob 660 with a quantized size of 11). Similarly, the bars for possible blob sizes with x-values of 9 through 3 also indicate that one blob detected for the frame 600A has a size larger than the respective quantized sizes 9 through 3 (also corresponding to the blob 660). That is, there are no additional blobs, other than blob 660, that have quantized sizes between 10 and 4. The bar 804 of the zoomed-in histogram 700B indicates that two blobs detected for the frame 600A have a size larger than a quantized size of 2 (corresponding to the blob 660 with a quantized size of 11 and the blob 658 with a quantized size of 3). The bar 806 indicates that five blobs detected for the frame 600A have a size larger than a quantized size of 1 (corresponding to the blob 660 with a quantized size of 11, the blob 658 with a quantized size of 3, and the three blobs 652, 654, 656 with quantized sizes of 2). The bar 808 indicates that six blobs (all blobs in this example) detected for the frame 600A have a size larger than a quantized size of 0 (corresponding to the blob 660 with a quantized size of 11, the blob 658 with a quantized size of 3, the three blobs 652, 654, 656 with quantized sizes of 2, and the noisy blob 662 with a quantized size of 1).

The lower boundary determination engine 526 analyzes the information in the histogram 700A and the CDF 800A to identify target lower boundaries tlb of the big blob (object) category and the small blob (object) category. As noted above, a category includes the blob sizes from a target lower boundary tlb up to either the maximum number of x (which is M) or the last determined target lower boundary tlb. To determine the target lower boundaries tlb, the lower boundary determination engine 526 performs an iterative process of analyzing the possible blob sizes x from the maximum number of x (which is M) to the minimal size 0. Each possible blob size x value in the histogram 700A is a candidate position for a cut. For example, the lower boundary determination engine 526 can check each possible blob size x value against the one or more conditions described above. A current possible blob size x value is set as a target lower boundary tlb of a category if one or more of the conditions, or a combination of the one or more conditions ($R_{sum}$), are satisfied by the current possible blob size x value. When the one or more conditions, or the combined conditions, are not satisfied for the current possible blob size x value, the lower boundary determination engine 526 iteratively moves to a smaller possible blob size x value and continues checking the one or more conditions.

Figure 9A:
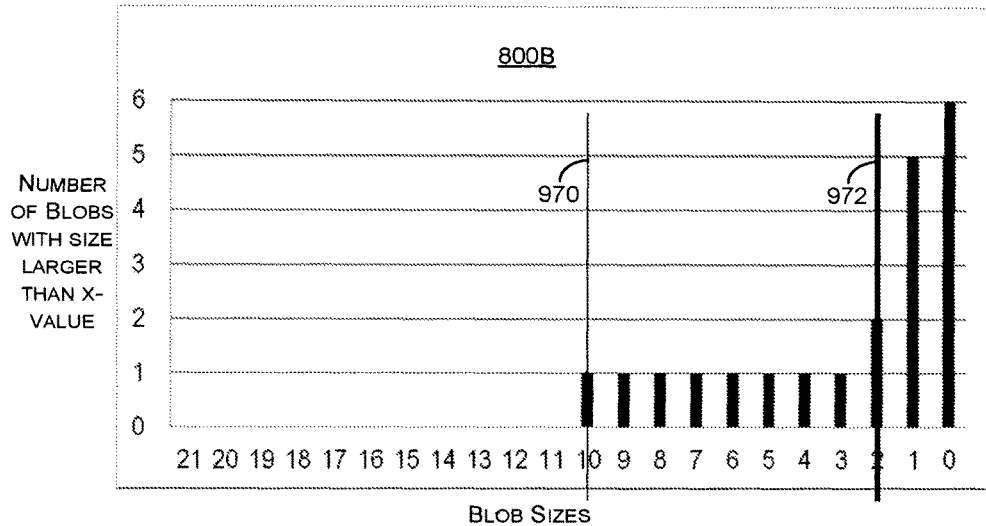
FIG. 9A is the zoomed-in view of the cumulative distribution function of blob sizes of the blobs shown in FIG. 6B with two determined lower boundaries, in accordance with some embodiments.
Figure 9B:
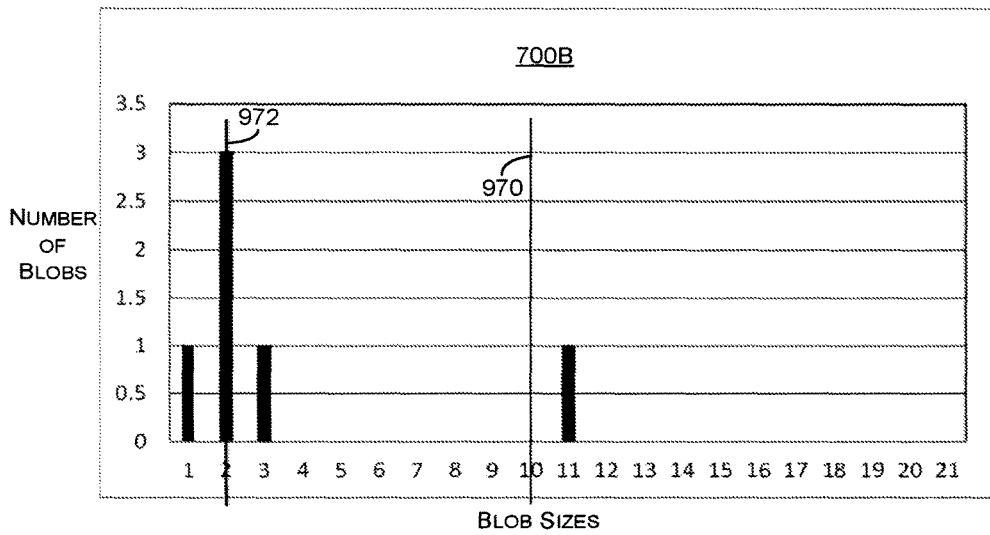
FIG. 9B is the zoomed-in view of the histogram of blob sizes of the blobs shown in FIG. 6B with the two determined lower boundaries, in accordance with some embodiments.

FIG. 9A is the zoomed-in CDF 800B with two determined target lower boundaries tlb 970 and tlb 972. FIG. 9B is the zoomed-in histogram 700B with the two determined target lower boundaries tlb 970 and tlb 972. The target lower boundary tlb 970 is the first cut, defining the first big category of blobs (objects) from the possible blob size x value of 10 to the maximum number of x (which is M=255). Hence, the big category of blobs for the frame 600A includes all blobs having a quantized value of 10 to 255. The target lower boundary tlb 970 can be determined by analyzing the one or more lower boundary conditions with respect to the possible blob size x value of 10.

The lower boundary determination engine 526 analyzes a first lower boundary condition that requires a number of blobs detected in a target current category cdf(x)-cdf(a) to be more than a blob number threshold $T_o$. As shown in FIG. 8B, there is one blob between the current possible blob size x value of 10 and the starting point a of the current blob category (which is M=255 in this example). Unless the blob threshold $T_o$ is set to a value of 0, this condition will not be met by the current possible blob size x value of 10. The number of blobs detected in the target current category cdf(x)-cdf(a) can also be compared with a threshold $T_p$*totalNumLeftBlobs, with totalNumLeftBlobs being the total number of blobs left or the value of N if the total number of blobs left is less than N. If the threshold $T_p$ is set to 25% and the N value is set to 13, the condition will be that the number of blobs in the target current category is higher than 3.25 (0.25*13). This condition will also not be met because there is only one blob between the current possible blob size x value of 10 and the starting point a of the current blob category.

The lower boundary determination engine 526 also analyzes a second lower boundary condition that is based on a size gap in the histogram 700A from the possible blob size x value of 10 (which has a positive histogram value) to a next possible blob size x' position with a positive histogram value. The next available position x' in the histogram satisfies pdf(x')>0, x'<x and pdf(y)=0, for any y>x' and y≤x. In the histogram 700A, the next available position x' is possible blob size value of 3. If the size gap from the x value of 10 and the x' value of 3 is larger than a size gap threshold, the current possible blob size x value of 10 is identified as the first target lower boundary tlb. Said another way, the current possible blob size x value of 10 can qualify as the first target lower boundary tlb if the value of x' is smaller than x*$T_r$. In one example, the threshold $T_r$ can be set to 0.4, in which case the condition is met because the value of x' is 3, which is less than 4 (10*0.4).

The current iteration of testing the possible blob sizes x through the clipped value of 255 terminates when the possible blob size x value of 10 qualifies as the first target lower boundary tlb. In some examples, the lower boundary determination engine 526 can also analyze a third lower boundary condition that is based on the number of bins left in the histogram, which is the value of x itself (here, a x value of 10). This condition would not be met unless the bin threshold $T_b$ is set to a large value of 11 or higher.

After the first target lower boundary tlb 970 is determined, the lower boundary determination engine 526 can start the iterative process anew from a new starting point a, which is the value of x after the previously determined lower boundary tlb 970. The new starting point a will be the possible blob size x value of 9. The lower boundary determination engine 526 can iteratively analyze each possible blob size x to determine if the possible blob size x qualifies as the second target lower boundary tlb 972. As shown in FIG. 9A and FIG. 9B, the target lower boundary tlb 972 is the second cut, defining the second small category of blobs (objects) from the possible blob size x value of 2 to the possible blob size x value of 9. The small category of blobs for the frame 600A thus includes all blobs having a quantized value of 2 to 9.

The lower boundary determination engine 526 can analyze the same conditions that were analyzed with respect to the big category of blobs. None of the conditions are met with respect to the possible blob size x values of 9 through 3. With respect to possible blob size x value 2, lower boundary determination engine 526 checks the first lower boundary condition, which requires a number of blobs detected in a target current category cdf(x)-cdf(a) to be more than a blob number threshold $T_o$. As shown in FIG. 8B, there is one blob between the current possible blob size x value of 2 and the starting point a of the current blob category (which is 9 in this example). Unless the blob threshold $T_o$ is set to a value of 0, this condition will not be met by the current possible blob size x value of 10. The number of blobs detected in the target current category cdf(x)-cdf(a) can also be compared with a threshold $T_p$*totalNumLeftBlobs, with totalNumLeftBlobs being the total number of blobs left or the value of N if the total number of blobs left is less than N. If the threshold $T_p$ is set to 25% and the N value is set to 13, the condition will be that the number of blobs in the target current category is higher than 3.25 (0.25*13). This condition will also not be met because there is only one blob between the current possible blob size x value of 2 and the starting point a of the current blob category.

The lower boundary determination engine 526 also analyzes the second lower boundary condition that is based on a size gap in the histogram 700A from the possible blob size x value of 2 (which has a positive histogram value) to a next possible blob size x' position with a positive histogram value. In the histogram 700A, the next available position x' is possible blob size value of 1. This condition will also not be met because the gap is too small.

The lower boundary determination engine 526 can then analyze the third lower boundary condition that is based on the number of bins left in the histogram, which is the value of x itself (here, a x value of 2). For example, the possible blob size x value of 2 can be qualified as the second target lower boundary tlb when the number of bins left (the current x value) is smaller than a bin threshold $T_b$. In this example, the bin threshold $T_b$ is set to 5 bins. The third lower boundary condition is met since there are only 2 bins left, which is smaller than 5 bins.

The current iteration of testing the possible blob sizes x terminates when the possible blob size x value of 2 qualifies as a the second target lower boundary tlb 972. After the second target lower boundary tlb 972 is determined, the lower boundary determination engine 526 can end the iterative process. In this example, since three typical size categories are used, only two iterations are performed. For example, after the target lower boundaries tlb 970 and tlb 972 are determined, the only remaining blobs are noise blobs. The target lower boundary tlb 972 of the second small object category is found after the two lower boundary determinations. The minimum blob size for the frame 600A can be determined as the blob size x at the target lower boundary tlb 972, which is in this case a quantized value of 2. The minimum blob size can be un-quantized and the un-quantized size can be used as the minimum blob size. For example, using the quantization step of 64, the quantized blob size x can be multiplied by 64 to determine the un-quantized size dequ(tlb). In this example, the un-quantized size dequ(tlb) is 128 pixels. The minimum blob size (denoted as ($S_i^t$)) of the current frame t can then be set to the un-quantized size dequ(tlb) of 128 pixels. In some examples, the minimum blob size $S_i^t$ of 128 pixels can be used as the minimum blob size threshold. All blobs for the frame 600A that are smaller than 128 pixels can be filtered from the blobs generated for the current frame. For the frame 600A, the blob 662 has a size of 64 pixels, and is filtered out because it is smaller than the minimum blob size $S_i^t$ of 128 pixels. All other blobs are maintained for the frame 600A.

In some embodiments, the minimum blob size ($S_i^t$) of the current frame t can be temporally filtered to produce a final minimum blob size $S_o^t$ (or small object size) of the frame 600A. As described above, for example, the final minimum blob size can be defined as $S_o^t=(w-1)S_o^{t-1}+wS_i^t$, where the term w is a weighting factor adaptively selected for each frame, $S_o^{t-1}$ is the final small object size of the previous frame, and $S_i^t$ is the initial size of the current frame. In examples in which temporal filtering is applied, the final minimum blob size $S_o^t$ can be used as the minimum blob size threshold, in which case blobs smaller than the final minimum blob size $S_o^t$ can be filtered from the blobs generated for the current frame.

Figure 10:
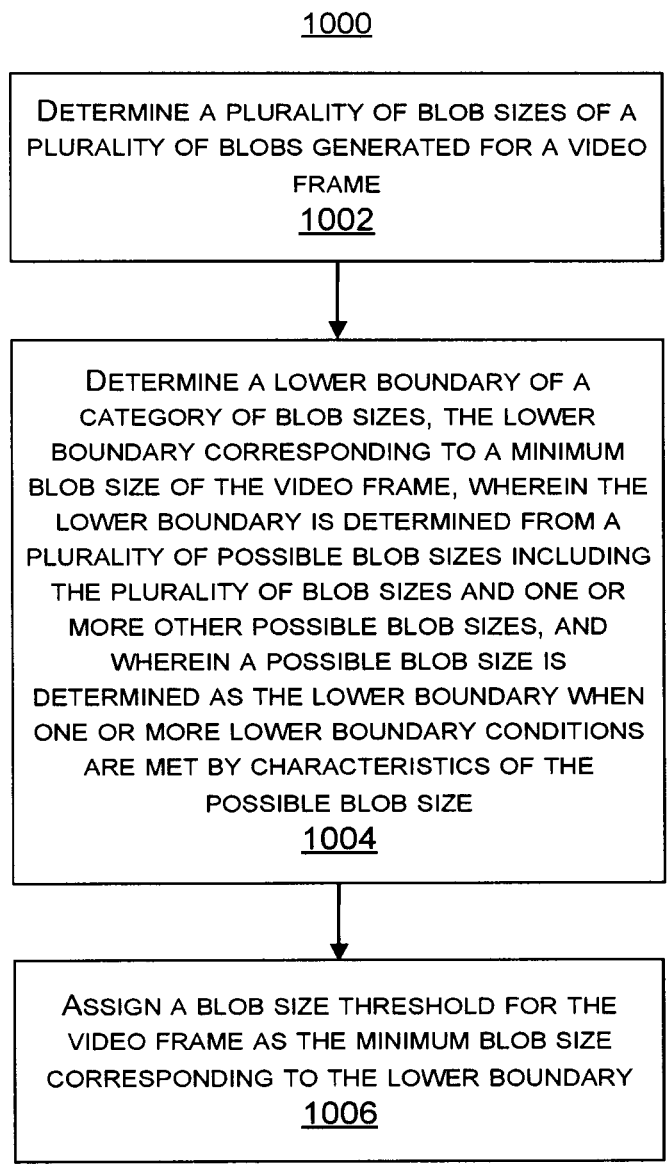
FIG. 10 is a flowchart illustrating an embodiment of a process of determining one or more blob size thresholds for filtering blobs, in accordance with some embodiments.

FIG. 10 illustrates an example of a process 1000 of filtering one or more blobs using the filtering techniques described herein. At 1002, the process 1000 includes determining a plurality of blob sizes of a plurality of blobs generated for a video frame. A blob includes pixels of at least a portion of one or more foreground objects in the video frame. For example, background subtraction can be performed to generate a foreground mask for the video frame, and connected component analysis can be performed to generate connected components. The blobs may be identified for the video frame based on the connected components. In some examples, morphology operations (e.g., one or more erosion and dilation functions) can be applied to the foreground mask prior to the connected component analysis to reduce noise present in the foreground mask.

At 1004, the process 1000 includes determining a lower boundary of a category of blob sizes. The lower boundary corresponds to a minimum blob size of the video frame. The lower boundary is determined from a plurality of possible blob sizes including the plurality of blob sizes and one or more other possible blob sizes. A possible blob size is determined as the lower boundary when one or more lower boundary conditions are met by characteristics of the possible blob size.

At 1006, the process 1000 includes assigning a blob size threshold for the video frame as the minimum blob size corresponding to the lower boundary. In some aspects, the process 1000 includes determining a size of a blob of the plurality of blobs is smaller than the blob size threshold, and filtering the blob from the plurality of blobs when the size of the blob is smaller than the blob size threshold. For example, the blob can be removed from the blobs maintained for the video frame.

In some examples, the process 1000 includes generating a histogram of the plurality of blob sizes. The histogram includes the plurality of possible blob sizes and a number of blobs corresponding to each possible blob size. An example of a histogram is shown in FIG. 7A and FIG. 7B. The lower boundary is determined based on the histogram. For example, determining the lower boundary can include determining the possible blob size in the histogram as the lower boundary. The possible blob size in the histogram is determined as the lower boundary when the one or more lower boundary conditions are met.

Various lower boundary conditions can be used. In some examples, the process 100 can include determining a second lower boundary of a second category of blob sizes. The second lower boundary includes a second possible blob size in the histogram. The second possible blob size is larger than the possible blob size in the histogram. For example, the second lower boundary can include the target lower boundary tlb 970 shown in FIGS. 9A and 9B. The process 1000 can include determining, for each possible blob size in the histogram, a number of blobs having a size larger than each possible blob size. An example of a determined number of blobs having a size larger than each possible blob size are shown on the y-axis of the cumulative distribution function shown in FIG. 8B. The process 1000 further includes determining a number of blobs having one or more sizes between the possible blob size in the histogram and the second possible blob size corresponding to the second lower boundary. In such examples, the one or more lower boundary conditions include the number of blobs being higher than a threshold number. Accordingly, the possible blob size in the histogram can be set as the lower boundary when the number of blobs between the possible blob size and the second possible blob size is higher than the threshold number of blobs (e.g., the threshold $T_o$ or threshold $T_p$*totalNumLeftBlobs described above).

In some examples, the one or more lower boundary conditions include a size gap from a current possible blob size with a positive histogram value to a next possible blob size with a positive histogram value being larger than a size gap threshold. For example, the size gap threshold can include a gap size between a current x value and a next available x' value that satisfies x'<x*$T_r$, as described above.

In some examples, the one or more lower boundary conditions include a total number of bins left in the histogram being less than a threshold number of bins. A bin of the histogram corresponds to a possible blob size in the histogram. As described previously, the number of bins left in the histogram is the value of a current possible blob size value (denoted as x above). In one illustrative example, the possible blob size can be set as the lower boundary when the number of bins left is smaller than a bin threshold $T_b$, as described above.

In some examples, the process 100 includes quantizing the plurality of possible blob sizes, and the histogram includes the quantized plurality of possible blob sizes. In some cases, the minimum blob size includes a quantized value determined using a quantization factor. In such cases, assigning the blob size threshold for the video frame as the minimum blob size includes dequantizing the minimum blob size by dividing the minimum blob size by the quantization factor, and assigning the blob size threshold as the dequantized minimum blob size.

In some examples, the minimum blob size includes an initial minimum blob size for the video frame. In such examples, the process 1000 can assign the blob size threshold for the video frame as the minimum blob size by determining a final minimum blob size by temporally filtering the initial minimum blob size. Temporally filtering the initial minimum blob size includes combining a final minimum blob size of a previous frame with the initial minimum blob size for the video frame. Further, the process 1000 can assign the blob size threshold for the video frame as the final minimum blob size. In some aspects, temporally filtering the initial minimum blob size further includes weighting the final minimum blob size of the previous frame by a first amount, weighting the initial minimum blob size for the video frame by a second amount, and combining the weighted final minimum blob size of the previous frame with the weighted initial minimum blob size for the video frame. In one illustrative example, the temporally filtered minimum blob size can be defined as $S_o^t = (w-1)S_o^t$, as described above.

In some examples, the process 1000 may be performed by a computing device or an apparatus, such as the video analytics system 100. For example, the process 1000 can be performed by the video analytics system 100, the blob detection engine 104, and/or the blob processing engine 318 or 518 shown in FIG. 1, FIG. 3, and FIG. 5, respectively. In some cases, the computing device or apparatus may include a processor, microprocessor, microcomputer, or other component of a device that is configured to carry out the steps of process 1000. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 1000 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The systems and methods described herein can be evaluated in an end-to-end IP camera (IPC) system. An example of such an evaluation is now described. Two processes are described, including a process to derive a current frame's initial small object size $S_i^t$ and a process to perform a temporal filtering to derive the final small object size $S_o^t$ for the current frame.

The process to derive the initial small object size $S_i^t$ for the current frame is described using pseudo code, in which the denotations introduced above are used. For simplicity, the process only focuses on explaining the algorithm and avoids parts that hit corner cases (e.g., when there are no blobs in the current frame). An example of pseudo code for deriving the initial small object size $S_i^t$ of the current frame includes:

```
Calculate pdf(x) and cdf(x).
M=256;
bTerminateCurrentIteration =0;
numCategory =0;
for (x = 255; x > 0&& numCategory<2; x--){
{
  if (pdf(x)==0) continue;
  // calculate x'
  x'=x;
  for (; x'>0&& pdf(x') == 0;x'--);
  // done calculating x'
  if (x < T_b || cdf(x)-cdf(M)>= T_o || x' < x.T_r ||
      cdf(x)-cdf(M)>= T_p * Max (cdf (0) - cdf (a), N)) {
    bTerminateCurrentIteration = 1;}
  else {
```

$$R_{sum} = \frac{T_b}{x} + \frac{cdf(x) - cdf(a)}{T_o} + \frac{cdf(x) - cdf(a)}{T_p * \text{Max}(cdf(0) - cdf(a), N)} + \frac{x.T_r}{x'};$$

```
    if (R_sum > T) bTerminateCurrentIteration =1;
    else bTerminateCurrentIteration =0;
  }
  if (bTerminateCurrentIteration){
    tlb = x;
    M = tlb;
    numCategory++;
  }
}
S_i^t = tlb <<6;
```

The process to derive the final small object size $S_o^t$ for the current frame is also described using pseudo code, in which the denotations introduced above are also used. An example of pseudo code for deriving the final small object size $S_o^t$ of the current frame includes:

```
1.   Initialize aWFLog2[2][2][2];
     w = WEIGHT_FACTOR_LOG2;
     for ( i = 0; i < 2; i++) //number of bbs big or small
         for ( j = 0; j < 2; j++) //number of bbs increased or
         decreased
             for ( k = 0; k < 2; k++) //number object size
             increased
                 aWFLog2[i][j][k] =
                     WEIGHT_FACTOR_LOG2;
     aWFLog2[1][1][1] -= 1; aWFLog2[1][1][0] += 1;
     aWFLog2[1][0][1] -= 1;
aWFLog2[0][0][0] +=1;
//default ones: aWFLog2[1][0][0] ; aWFLog2[0][1][1] aWFLog2[0][1][0]
aWFLog2[0][0][1]
2.   Adjust the weighting factor
     Denote the number of blobs in the frame t as Num_b^t
     for ( i = 0; i < 2; i++) //number of bbs big or small
         if (Num_b^t> Num_b^{t-1}*2. && (Num_b^{t-1}>N_s || Num_b^t>N_b))
//different level of numbers, increase weight by 2
```

-continued

```
        ws += 2;
      else if (Num_b^{t-1} > Num_b^t *2 && (Num_b^t > N_s || Num_b^{t-1} > N_b))
//different level of numbers, decrease weight by 2
        ws -= 2;
      else // in the same level of numbers
      {
        jIdx = (Num_b^t > Num_b^{t-1}) ? 1 : 0;
        kIdx = (S_i^t > S_o^{t-1}) ? 1 : 0;
        iIdx = (MAX(Num_b^t, Num_b^{t-1}) > N_m) ? 1 : 0;
        ws = aWFLog2[iIdx][jIdx][kIdx];
      }
  3.  Calculate the small size for the current frame
        S_o^t = ((1 « ws) - 1)S_o^{t-1} + S_i^t + (1 « (ws - 1))) » ws
```

For number 2 above ("Adjust the weighting factor"), a factor of 2 is used to distinguish whether $Num_b^t$ is quite different from the $Num_b^{t-1}$. In other examples, any other ratios can be used to decide whether they are quite different or belong to the same level.

If the number of blobs increases significantly, it may indicate the current frame is noisy, therefore the transition of the small objet size towards $S_i^t$ will be made much slower (with a larger value of ws). If the number of blobs decreases significantly, it may indicate the current frame has less noise, therefore the transition of the small objet size towards $S_i^t$ will be made much faster (with a larger value of ws). In all the other cases, depending on whether the number of blobs increased, whether the size is to be increased, or whether the numbers of blobs are in a certain level, ws may be set as the default value being slightly increased or decreased by 1. The default value WEIGHT_FACTOR_LOG2 is set relatively conservative, so that the adaptation to a newer size could take, for example, half a second. For example, in this case, WEIGHT_FACTOR_LOG2 is set to 4.

Various simulations can also be used to show the value of the adaptive small object size derivation techniques described herein, for example how the techniques are critical for the accuracy of blob detection in video analytics. Two example sets of simulations are used verify the proposed method.

The first simulation can include a comparison with input sizes. For example, the first simulation is performed in an early version of the IPC development, where the anchor method needs to set the small object size (in terms of pixels) manually for each video clip. Using the anchor method, in order to maintain the detection accuracy, the small object size is manually measured for each video clip and the small object size was provided as an input parameter together with the video clip as the input to the video analytics. In contrast, the adaptive small object size derivation described herein can automatically generate the small object size. Table 1 below illustrates a comparison between the adaptive small object size derivation method and the manually selected object size in the anchor method.

TABLE 1

| Sequence name | Detection Rate Anchor method (with input size) | Detection Rate Proposed method (with adaptive small size) |
|---|---|---|
| IPCVA_1 | 0.5108 | 0.5083 |
| IPCVA_2 | 0.333 | 0.4078 |
| IPCVA_3 | 0.466 | 0.4943 |
| IPCVA_4 | 0.3094 | 0.3748 |
| IPCVA_5 | 0.4415 | 0.4606 |
| IPCVA_6 | 0.5905 | 0.6058 |
| IPCVA_7 | 0.0287 | 0.0299 |
| IPCVA_8 | 0.0757 | 0.0783 |
| VIRAT_1 | 0.2225 | 0.265 |
| VIRAT_2 | 0.5266 | 0.5216 |
| Average | 0.35047 | 0.37464 |

As can be seen from the results in table 1, the adaptive small object size derivation method does not decrease the detection rate, and actually slightly increases the detection rate, meaning that such an automatic method may produce a small object size that is more precise than carefully selected and measured input sizes.

The second simulation can include a comparison with various fixed sizes. The small object size has a large range. For example, the range of the small object size can vary from 64, 100, to more than 1000. Therefore, it is difficult to select one size that could work for all the video clips. The second simulation can be performed using a latest version of the IPC software, wherein instead of using the adaptive small size derived according to the techniques described herein, different sizes are used. Each of the tested fixed sizes applies to all test video clips. The tested fixed sizes are: 64, 128, 256, 512 and 1024.

Instead of just comparing the blob detection rate in an earlier version, as in the first simulation, a version 2.0 with the adaptive small object size derivation technique implemented is compared with the above-mentioned fixed sizes, with all other video analytics components remaining the same. Here, the system can be evaluated in a much more advanced manner, which utilizes not only the detection rate, but also other important criteria, such as tracking rate, true positive rate (in terms of detected objects/events), and false positive rate.

FIG. 11 illustrates a comparison between the adaptive small object size derivation technique with other fixed sizes for detection rate.

As shown in FIG. 11, a fixed size close to 1024 (pixels) may start to introduce significant loss of detection rate.

FIG. 12 illustrates a comparison between the adaptive small object size derivation technique with other fixed sizes for tracking rate.

As shown in FIG. 12, a fixed size larger than 512 (pixels) may start to introduce significant performance loss of tracking rate. Similarly, a size that is too small (e.g., 64) may also make the tracking rate worse.

FIG. 13 illustrates a comparison between the adaptive small object size derivation technique with other fixed sizes for true positive rate.

As shown in FIG. 13, a fixed size that is too large may start to introduce significant performance loss of a true positive rate.

FIG. 14 illustrates a comparison between the adaptive small object size derivation technique with other fixed sizes for false positive rate.

As shown in FIG. 14, a fixed size being too small may introduce very significant performance loss of false positive rate. Only by simply checking the average values, it is clear several sizes are not good. However, it is worthwhile to take a close look at the comparison between the proposed method and the case when size is set to 256.

FIG. 15 illustrates a comparison between the adaptive small object size derivation technique with fixed size equal to 256.

As shown in FIG. 15, the average values of the proposed adaptive small object size derivation technique are better than the fixed size of 256, although the difference is not significant. According to the experience, a large object size will lead to a lot of filtered small objects, thus further moving objects may not be detected until there are quite close, which is a major reason why the tracking rate is worse (because some objects may be detected much later, e.g, in VIRAT_S_0) and true false positive rate is small (because some objects may never get a chance to be detected just because they are too far and such an object is not known for the end-to-end system).

Also, for more noisy sequences, such as IPCVA video clips, the false positive rates increase significantly to values that are almost unacceptable (higher than 40% and close to 50%).

Therefore, although a fixed size, if carefully selected for all video clips, may produce relatively closer results as compared to the adaptive small object size derivation technique. However, a fixed size does not have the flexibility of incorporating different levels of scene complexity, therefore never performs better than the adaptive small object size derivation technique statistically speaking and in many cases, provides much worse results.

The adaptive small object size derivation techniques discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of determining one or more blob size thresholds for filtering blobs, including:

detecting a plurality of blobs for a video frame of a video sequence, wherein a blob includes pixels of at least a portion of an object in the video frame;

determining a plurality of blob sizes of the plurality of blobs detected for the video frame;

determining a lower boundary of a category of blob sizes, the lower boundary corresponding to a minimum blob size of the video frame, wherein the lower boundary is determined from a plurality of possible blob sizes including the plurality of blob sizes and one or more other possible blob sizes, and wherein a possible blob size is determined as the lower boundary when one or more lower boundary conditions are met by characteristics of the possible blob size;

assigning a blob size threshold for the video frame as the minimum blob size corresponding to the lower boundary, wherein a blob size threshold is determined for each video frame of the video sequence based on sizes of blobs detected for each video frame;

generating a filtered set of blobs for object tracking for the video frame based on the blob size threshold, the filtered set of blobs being generated by removing at least one blob from the plurality of blobs when a size of the at least one blob is smaller than the blob size threshold; and tracking one or more blobs from the filtered set of blobs using one or more blob trackers.

2. The method of claim 1, further comprising:
determining a size of a blob of the plurality of blobs is smaller than the blob size threshold; and
filtering the blob from the plurality of blobs when the size of the blob is smaller than the blob size threshold.

3. The method of claim 1, further comprising:
generating a histogram of the plurality of blob sizes, the histogram including the plurality of possible blob sizes and a number of blobs corresponding to each possible blob size, wherein the lower boundary is determined based on the histogram.

4. The method of claim 3, further comprising:
quantizing the plurality of possible blob sizes, wherein the histogram includes the quantized plurality of possible blob sizes.

5. The method of claim 4, wherein the minimum blob size includes a quantized value determined using a quantization factor, and wherein assigning the blob size threshold for the video frame as the minimum blob size includes:
dequantizing the minimum blob size by dividing the minimum blob size by the quantization factor; and
assigning the blob size threshold as the dequantized minimum blob size.

6. The method of claim 3, wherein determining the lower boundary comprises:
determining the possible blob size in the histogram as the lower boundary, wherein the possible blob size in the histogram is determined as the lower boundary when the one or more lower boundary conditions are met.

7. The method of claim 6, further comprising:
determining a second lower boundary of a second category of blob sizes, wherein the second lower boundary includes a second possible blob size in the histogram, the second possible blob size being larger than the possible blob size in the histogram; and
determining a number of blobs having one or more sizes between the possible blob size in the histogram and the second possible blob size corresponding to the second lower boundary, wherein the one or more lower boundary conditions include the number of blobs being higher than a threshold number.

8. The method of claim 6, wherein the one or more lower boundary conditions include a size gap from a current possible blob size with a positive histogram value to a next possible blob size with a positive histogram value being larger than a size gap threshold.

9. The method of claim 6, wherein the one or more lower boundary conditions include a total number of bins left in the histogram being less than a threshold number of bins, wherein a bin corresponds to a possible blob size in the histogram.

10. The method of claim 1, wherein the minimum blob size includes an initial minimum blob size for the video frame, and wherein assigning the blob size threshold for the video frame as the minimum blob size includes:
determining a final minimum blob size by temporally filtering the initial minimum blob size, wherein temporally filtering the initial minimum blob size includes combining a final minimum blob size of a previous frame with the initial minimum blob size for the video frame; and
assigning the blob size threshold for the video frame as the final minimum blob size.

11. The method of claim 10, wherein temporally filtering the initial minimum blob size further includes:
weighting the final minimum blob size of the previous frame by a first amount;
weighting the initial minimum blob size for the video frame by a second amount; and
combining the weighted final minimum blob size of the previous frame with the weighted initial minimum blob size for the video frame.

12. An apparatus comprising:
a memory configured to store video data; and
a processor configured to:
detect a plurality of blobs for a video frame of a video sequence, wherein a blob includes pixels of at least a portion of an object in the video frame;
determine a plurality of blob sizes of the plurality of blobs detected for the video frame;
determine a lower boundary of a category of blob sizes, the lower boundary corresponding to a minimum blob size of the video frame, wherein the lower boundary is determined from a plurality of possible blob sizes including the plurality of blob sizes and one or more other possible blob sizes, and wherein a possible blob size is determined as the lower boundary when one or more lower boundary conditions are met by characteristics of the possible blob size;
assign a blob size threshold for the video frame as the minimum blob size corresponding to the lower boundary, wherein a blob size threshold is determined for each video frame of the video sequence based on sizes of blobs detected for each video frame;
generate a filtered set of blobs for object tracking for the video frame based on the blob size threshold, the filtered set of blobs being generated by removing at least one blob from the plurality of blobs when a size of the at least one blob is smaller than the blob size threshold; and
track one or more blobs from the filtered set of blobs using one or more blob trackers.

13. The apparatus of claim 12, wherein the processor is further configured to:
determine a size of a blob of the plurality of blobs is smaller than the blob size threshold; and
filter the blob from the plurality of blobs when the size of the blob is smaller than the blob size threshold.

14. The apparatus of claim 12, wherein the processor is further configured to:
generate a histogram of the plurality of blob sizes, the histogram including the plurality of possible blob sizes and a number of blobs corresponding to each possible blob size, wherein the lower boundary is determined based on the histogram.

15. The apparatus of claim 14, wherein the processor is further configured to:
quantize the plurality of possible blob sizes, wherein the histogram includes the quantized plurality of possible blob sizes.

16. The apparatus of claim 15, wherein the minimum blob size includes a quantized value determined using a quantization factor, and wherein assigning the blob size threshold for the video frame as the minimum blob size includes:
dequantizing the minimum blob size by dividing the minimum blob size by the quantization factor; and
assigning the blob size threshold as the dequantized minimum blob size.

17. The apparatus of claim 14, wherein determining the lower boundary comprises:
determining the possible blob size in the histogram as the lower boundary, wherein the possible blob size in the histogram is determined as the lower boundary when the one or more lower boundary conditions are met.

18. The apparatus of claim 17, wherein the processor is further configured to:
determine a second lower boundary of a second category of blob sizes, wherein the second lower boundary includes a second possible blob size in the histogram, the second possible blob size being larger than the possible blob size in the histogram; and
determine a number of blobs having one or more sizes between the possible blob size in the histogram and the second possible blob size corresponding to the second lower boundary, wherein the one or more lower boundary conditions include the number of blobs being higher than a threshold number.

19. The apparatus of claim 17, wherein the one or more lower boundary conditions include a size gap from a current possible blob size with a positive histogram value to a next possible blob size with a positive histogram value being larger than a size gap threshold.

20. The apparatus of claim 17, wherein the one or more lower boundary conditions include a total number of bins left in the histogram being less than a threshold number of bins, wherein a bin corresponds to a possible blob size in the histogram.

21. The apparatus of claim 12, wherein the minimum blob size includes an initial minimum blob size for the video frame, and wherein assigning the blob size threshold for the video frame as the minimum blob size includes:
determining a final minimum blob size by temporally filtering the initial minimum blob size, wherein temporally filtering the initial minimum blob size includes combining a final minimum blob size of a previous frame with the initial minimum blob size for the video frame; and
assigning the blob size threshold for the video frame as the final minimum blob size.

22. The apparatus of claim 21, wherein temporally filtering the initial minimum blob size further includes:
weighting the final minimum blob size of the previous frame by a first amount;
weighting the initial minimum blob size for the video frame by a second amount; and
combining the weighted final minimum blob size of the previous frame with the weighted initial minimum blob size for the video frame.

23. A non-transitory computer-readable medium having stored thereon instructions that when executed by one or more processors, cause the one or more processor to:
detect a plurality of blobs for a video frame of a video sequence, wherein a blob includes pixels of at least a portion of an object in the video frame;
determine a plurality of blob sizes of the plurality of blobs detected for the video frame;
determine a lower boundary of a category of blob sizes, the lower boundary corresponding to a minimum blob size of the video frame, wherein the lower boundary is determined from a plurality of possible blob sizes including the plurality of blob sizes and one or more other possible blob sizes, and wherein a possible blob size is determined as the lower boundary when one or more lower boundary conditions are met by characteristics of the possible blob size;
assign a blob size threshold for the video frame as the minimum blob size corresponding to the lower boundary, wherein a blob size threshold is determined for each video frame of the video sequence based on sizes of blobs detected for each video frame;
generate a filtered set of blobs for object tracking for the video frame based on the blob size threshold, the filtered set of blobs being generated by removing at least one blob from the plurality of blobs when a size of the at least one blob is smaller than the blob size threshold; and
track one or more blobs from the filtered set of blobs using one or more blob trackers.

24. The computer-readable medium of claim 23, further comprising instructions that, when executed by one or more processors, cause the one or more processor to:
determine a size of a blob of the plurality of blobs is smaller than the blob size threshold; and
filter the blob from the plurality of blobs when the size of the blob is smaller than the blob size threshold.

25. The computer-readable medium of claim 23, further comprising instructions that, when executed by one or more processors, cause the one or more processor to:
generate a histogram of the plurality of blob sizes, the histogram including the plurality of possible blob sizes and a number of blobs corresponding to each possible blob size, wherein the lower boundary is determined based on the histogram.

26. The computer-readable medium of claim 25, further comprising instructions that, when executed by one or more processors, cause the one or more processor to:
determine a second lower boundary of a second category of blob sizes, wherein the second lower boundary includes a second possible blob size in the histogram, the second possible blob size being larger than the possible blob size in the histogram; and
determine a number of blobs having one or more sizes between the possible blob size in the histogram and the second possible blob size corresponding to the second lower boundary, wherein the one or more lower boundary conditions include the number of blobs being higher than a threshold number.

27. The computer-readable medium of claim 25, wherein the one or more lower boundary conditions include at least one or more of:
a size gap from a current possible blob size with a positive histogram value to a next possible blob size with a positive histogram value being larger than a size gap threshold; and a total number of bins left in the histogram being less than a threshold number of bins, wherein a bin corresponds to a possible blob size in the histogram.

28. The computer-readable medium of claim 23, wherein the minimum blob size includes an initial minimum blob size for the video frame, and wherein assigning the blob size threshold for the video frame as the minimum blob size includes:
   determining a final minimum blob size by temporally filtering the initial minimum blob size, wherein temporally filtering the initial minimum blob size includes combining a final minimum blob size of a previous frame with the initial minimum blob size for the video frame; and
   assigning the blob size threshold for the video frame as the final minimum blob size.

29. The method of claim 1, wherein the lower boundary is determined by iteratively comparing each possible blob size from the plurality of possible blob sizes to the one or more lower boundary conditions.

30. The apparatus of claim 12, wherein the lower boundary is determined by iteratively comparing each possible blob size from the plurality of possible blob sizes to the one or more lower boundary conditions.

* * * * *